United States Patent
Kurosu et al.

[11] Patent Number: 5,680,541
[45] Date of Patent: Oct. 21, 1997

[54] DIAGNOSING METHOD AND APPARATUS

[75] Inventors: Yutaka Kurosu; Fumitaka Nishiyama; Junji Ishiguro; Tadakazu Kimura, all of Kanagawa, Japan

[73] Assignee: Fuji Xerox Co., Ltd., Tokyo, Japan

[21] Appl. No.: 991,092

[22] Filed: Dec. 15, 1992

[30] Foreign Application Priority Data

| Dec. 16, 1991 | [JP] | Japan | 3-332315 |
| Dec. 16, 1991 | [JP] | Japan | 3-332317 |
| Dec. 16, 1991 | [JP] | Japan | 3-332319 |
| Dec. 16, 1991 | [JP] | Japan | 3-351776 |
| Dec. 16, 1991 | [JP] | Japan | 3-351777 |

[51] Int. Cl.$^6$ ............................................. G06F 11/00
[52] U.S. Cl. ........................ 395/183.02; 395/186.01
[58] Field of Search .............................. 395/575, 180, 395/183.01, 183.02, 183.16, 184.01, 185.01; 371/15.1, 16.4, 16.5; 355/203, 204, 205, 206; 358/434, 504; 364/265, 26, 943.9, 944.9

[56] References Cited

U.S. PATENT DOCUMENTS

| 4,514,846 | 4/1985 | Federico et al. | 371/16 |
| 4,876,606 | 10/1989 | Banno et al. | 355/203 |
| 4,922,491 | 5/1990 | Coale et al. | 395/183.02 |
| 4,985,857 | 1/1991 | Bajpai et al. | 364/551.01 |
| 5,018,143 | 5/1991 | Platteter et al. | 371/16.4 |
| 5,084,875 | 1/1992 | Weinberger et al. | 371/16.4 |
| 5,293,556 | 3/1994 | Hill et al. | 395/183.02 |
| 5,351,247 | 9/1994 | Daw et al. | 395/183.02 |

FOREIGN PATENT DOCUMENTS

| 2-100141 (A) | 4/1990 | Japan . |
| 3-3010 (A) | 1/1991 | Japan . |
| 2-154128 (A) | 7/1991 | Japan . |

*Primary Examiner*—Robert W. Beausoliel, Jr.
*Assistant Examiner*—Trinh L. Tu
*Attorney, Agent, or Firm*—Finnegan, Henderson, Farabow, Garrett & Dunner, L.L.P.

[57] ABSTRACT

Disclosed is a diagnosing method for diagnosing devices to be diagnosed on the basis of information on operating status of the diagnosed devices. In the method, information on operating status of a plurality of diagnosed devices is collected, then common symptoms, which are common to the diagnosed devices, are extracted from a plurality of items of the information on operating status, and after that a trouble to probably occur in the diagnosed devices is determined on the basis of the common symptoms.

1 Claim, 25 Drawing Sheets

FIG. 18

| HOST LEVEL | RIC LEVEL | CONTENTS | RICFB ALERT NO. | TRANSMISSION TIMING |
|---|---|---|---|---|
| PRIORITY 50 | LEVEL 1 | SYSTEM FAIL : MACHINE CANNOT BE USED | FF~B0 | |
| PRIORITY 40 | LEVEL 2 | LOCAL FAIL : USE OF ONLY THE RELATED FUNCTION IS PROHIBITED | AF~A0 | SEND IT TO RIC HOST IMMEDIATELY AFTER THE TROUBLE OCCURS |
| PRIORITY 30 | LEVEL 3 | TIME BOMB : USE OF THE MACHINE IS PROHIBITED AFTER A TIME ELAPSES | 9F~90 | |
| PRIORITY 20 | LEVEL 4 | PREVENT MAINTENANCE : HFSI AND JAM ARE IN EXCESS OF THE THRESHOLD LEVEL | 8F~60 5F~50 | |
| PRIORITY 10 | LEVEL 5 | INFORMATION : INTERLOCK OPEN AND AUTOCLEAR ARE IN EXCESS OF THE THRESHOLD LEVEL | 4F~40 | SEND IT TO RIC HOST WITHIN 24 HOURS WHEN TROUBLE OCCURS |
| PRIORITY 5 | LEVEL 6 | OTHERS : EXPENDABLE DELIVERY DATA IS IN EXCESS OF THE THRESHOLD LEVEL | 3F~30 | SAME AS ABOVE |

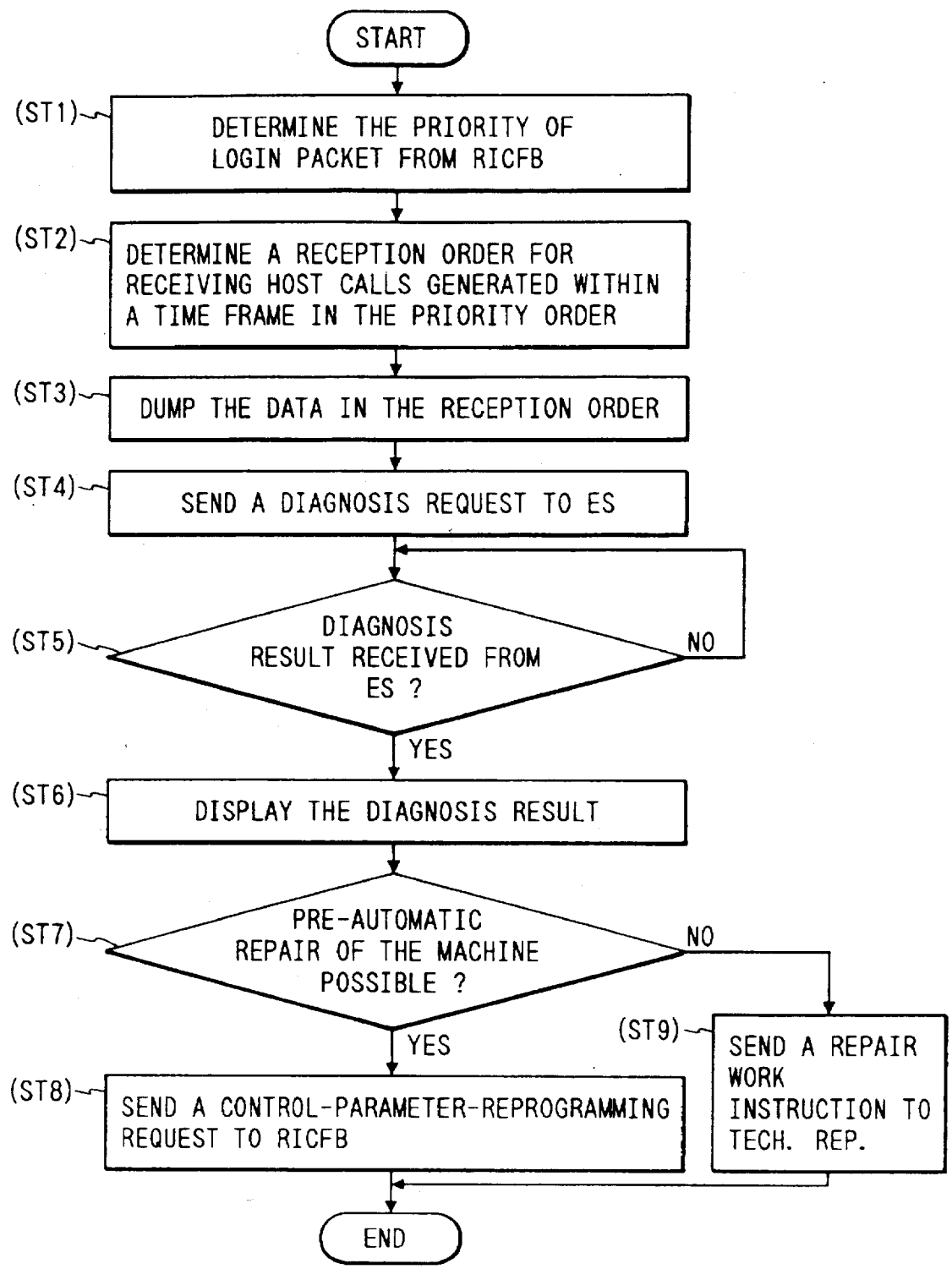

FIG. 25

| PARAMETER | ... | DETERMI-NATION CRITERION 13 | DETERMI-NATION CRITERION 14 | DETERMI-NATION CRITERION 15 | DETERMI-NATION CRITERION 16 | DETERMI-NATION CRITERION 17 | DETERMI-NATION CRITERION 18 | DETERMI-NATION CRITERION 19 | DETERMI-NATION CRITERION 20 | ... |
|---|---|---|---|---|---|---|---|---|---|---|
| SURFACE POTENTIAL OF P/R BELT | ... | A-V | A-VI | A-VI | A-X/A-III | A-X/A-III | A-X/A-III | A-X/A-III | A-X/A-III | ... |
| GRID MONITOR VALUE | ... | A-V | A-VI | A-VI | A-X/A-III | A-X/A-III | A-X/A-III | A-X/A-III | A-X/A-III | ... |
| ADC PATCH POTENTIAL | ... | B-IV/B-VI | B-V | B-V | B-I | B-VII | B-V | B-VII | B-IX | ... |
| LIGHT CONTROL VALUE | ... | B-IV/B-VI | B-V | B-V | B-I | B-VII | B-V | B-VII | B-IX | ... |
| SURVEILLANCE VALUE OF ADC PATCH | ... | - | - | - | - | - | - | - | - | ... |
| REFLECTION VALUE OF P/R BELT | ... | - | - | - | - | - | - | - | - | ... |
| ... | ... | - | - | - | - | - | - | - | - | ... |
| SURFACE POTENTIAL TARGET VALUE OF P/R BELT | ... | - | $\beta+1$ | $\alpha\sim\beta$ | - | - | - | - | - | ... |
| ... | ... | - | - | - | - | - | - | - | - | ... |
| ... | ... | - | - | - | - | - | - | - | - | ... |
| ... | ... | - | - | - | - | - | - | - | - | ... |
| ... | ... | - | - | - | - | - | - | - | - | ... |
| ... | ... | - | - | - | - | - | - | - | - | ... |
| ... | ... | - | - | - | - | - | - | - | - | ... |
| ... | ... | - | - | - | - | - | - | - | - | ... |
| TROUBLE DETERMINATION VALUE | | CQ013 | CQ014 | CQ015 | CQ016 | CQ017 | CQ018 | CQ019 | CQ020 | |

FIG. 26

| HYPOTHETICAL TROUBLE | HYPOTHETICAL TROUBLE CAUSE | CONDITION | NVM ITEM TO FINALLY DETERMINE TROUBLE | DETERMINATION CRITERION |
|---|---|---|---|---|
| ---- | ---- | ---- | ---- | ---- |
| TOO HIGH DENSITY/FOG LEVEL 1 | T13 | A-V : B-IV/B-VI | U13 | DETERMINATION CRITERION 13 |
| TOO HIGH DENSITY/FOG LEVEL 2 | T14 | A-VI : B-V | U14 | DETERMINATION CRITERION 14 |
| TOO HIGH DENSITY/FOG LEVEL 3 | T15 | A-VI : B-V | U15 | DETERMINATION CRITERION 15 |
| TOO HIGH DENSITY/FOG LEVEL 4 | T16 | A-X/A-III : B-I | U16 | DETERMINATION CRITERION 16 |
| TOO HIGH DENSITY/FOG LEVEL 5 | T17 | A-X/A-III : B-VII | U17 | DETERMINATION CRITERION 17 |
| TOO LOW DENSITY LEVEL 1 | T18 | A-X/A-III : B-V | U18 | DETERMINATION CRITERION 18 |
| TOO LOW DENSITY LEVEL 2 | T19 | A-X/A-III : B-VIII | U19 | DETERMINATION CRITERION 19 |
| TOO LOW DENSITY LEVEL 3 | T20 | A-X/A-III : B-VI | U20 | DETERMINATION CRITERION 20 |
| ---- | ---- | ---- | ---- | ---- |

DIAGNOSING METHOD AND APPARATUS

BACKGROUND OF THE INVENTION

1. Field of the Invention

The present invention relates to a diagnosing method and apparatus for diagnosing such electronic terminal devices as copying machines. More particularly, the invention relates to the improvement over a diagnosing method and apparatus for individually diagnosing a plurality of terminal devices by a remote control system.

2. Discussion of the Related Art

Japanese Patent Unexamined Publication No. Hei. 3-154128 discloses one of the known methods for individually diagnosing a plurality of terminal devices in a manner that diagnosis data are collected from the plurality of terminal devices and a host computer individually diagnoses those terminal devices on the basis of those data items collected. Further, an expert system has been used as means for solving problems on the diagnosis. Generally, an expert system of the production rule type executes production rules containing pairs of conditions and conclusions, thereby reasoning abnormal status of terminal devices, as discussed in Japanese Patent Unexamined Publication No. Hei. 2-100141.

Japanese Patent Unexamined Publication No. Hei. 3-3010 discloses a technique for reasoning abnormal status from the data collected from an object to be supervised by using a supervising/control apparatus.

In the diagnosing system with such a reasoning mechanism, it is necessary to prepare a number of rules as a knowledge base. An accuracy of the results of diagnosis by the expert system depends on whether the rules prepared are proper or improper.

The rules employed in the conventional diagnosing system are those based on the known principles or readily predicted from the experiences thus far accumulated. Accordingly, the diagnosing system fails to cope with the troubles and faults which cannot be predicted.

For example, before new models of copying machines are delivered to markets, careful and complete inspections of the copying machines are made for the purpose of preventing every trouble to occur in advance. Measurement is previously taken for the factors to possibly cause troubles. Such trouble-causing factors are incorporated as rules into the knowledge base, and will be used when the expert system is operated for diagnosis. However, there are some troubles to occur after a great number of products have been marketed. This type of the trouble contains many troubles of the type that cannot be predicted from the experiences thus far made. Particularly the sheet transporting system in the copying machine frequently encounters this type of troubles. In the sheet transporting system, not only mechanical conditions but also the nature of sheet and variation in atmospheric conditions, such as temperature and humidity, affect delicate influences on the sheet transporting characteristics. Accordingly, it is almost impossible to reproduce every cause for jam in laboratories.

If a new type of trouble occurs, a service man merely repairs the machine for removing the trouble. No or little information on the new type of trouble is fed back to service centers or other service men. This is the present actual circumstances in trouble occurrence.

To gain effective diagnosis, it is necessary that the new type of troubles and their causes are incorporated as new rules into the knowledge base of the expert system. However, the devices to realize the expert system are installed in the service stations which are widely distributed in the whole country. Accordingly, much troublesome work is required for updating the knowledge base. Some type of expert systems rejects the updating of the knowledge base. Where such expert systems are used, the knowledge becomes old-fashioned soon.

SUMMARY OF THE INVENTION

The present invention has been made in view of the above circumstances and has an object to provide a diagnosing method and apparatus which can cope with such troubles of the diagnosed devices that cannot be predicted.

To achieve the above object, the invention provides a diagnosing method for diagnosing devices to be diagnosed, including the steps of collecting information on a plurality of kinds of operating status; extracting common symptoms from the information on the plurality of kinds of operating status; and determining a trouble to probably occur on the basis of the common symptoms.

Also, the invention provides a diagnosing apparatus for diagnosing devices to be diagnosed on the basis of operating status information containing a plurality of factors indicative of operating status of the diagnosed devices, including a plurality of communication control means, provided in associated with a plurality of devices to be diagnosed, for sending the received operating status information indicative of operating status of the diagnosed devices to exterior; a host computer for collecting the operating status information from the plurality of communication control means; and a diagnosing section for diagnosing the operating status of the diagnosed devices on the basis of the operating status information obtained from the host computer, the diagnosing section including analyzing means for analyzing the operating status information of the plurality of diagnosed devices to obtain common symptoms which are common to the plurality of diagnosed devices, and storing means for storing the common symptoms obtained from the analyzing means.

BRIEF DESCRIPTION OF THE DRAWINGS

The accompanying drawings, which are incorporated in and constitute a part of this specification illustrate, the embodiments of the invention and, together with the description, serve to explain the objects, advantages and principles of the invention. In the drawings.

FIG. 18 is a table showing how the alert data is transferred from the RICFB;

FIG. 19 is a flow chart showing a sequence of processing steps executed by the host computer;

FIG. 25 is a table showing check criteria for checking image-quality troubles; and FIG. 26 is a table showing several examples of hypothetical troubles and their causes for the check criteria.

DETAILED DESCRIPTION OF THE PREFERRED EMBODIMENTS

The preferred embodiments of the present invention will be described with reference to the accompanying drawings.

1st Embodiment

Figure 1:
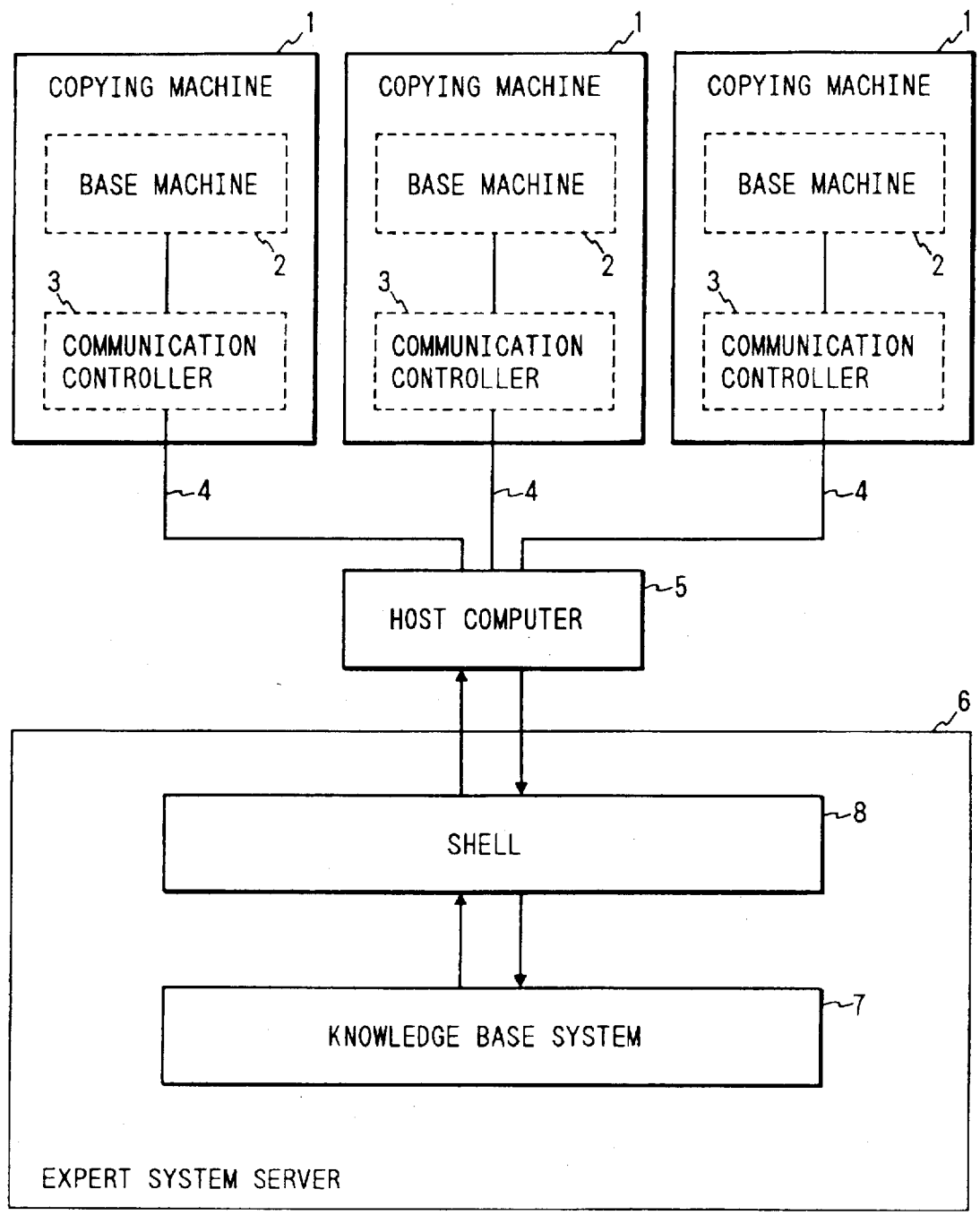
FIG. 1 is a block diagram showing a diagnosing system according to an embodiment of the present invention.

FIG. 1 is a block diagram showing a diagnosing system according to an embodiment of the present invention. In the present embodiment, terminal devices to be diagnosed are copying machines.

As shown, each of the copying machines 1 contains a base machine 2 and a communication controller 3. Each communication controller 3 collects the information (jam, copy quality, etc.) on operating status of the base machine 2 associated with the controller, and sends the operating status information to a host computer 5 by way of a communication line 4, e.g., a telephone line. The host computer 5 is connected to an expert system server 6. The server 6 diagnoses the base machine on the basis of the information received from the host computer 5, and sends back to the host computer 5 the information on the diagnosis results and how to cope with the trouble or troubles in the base machine. The expert system server 6, constructed on a normal work station or a normal computer, includes a knowledge base system 7 which contains a knowledge base constructed with expert's knowledge and an engine for inferring the cause of the trouble from the knowledge base, and a shell 8 for controlling the communication between the knowledge base system 7 and the host computer 5.

The copying machines 1 are installed in client's offices, factories, or the like. The host computer 5 and the expert system server 6 are installed in service stations, factories, or the like of the maker who manufactured and sold the copying machines. The copying machines may be different types of copying machines.

Figure 2:
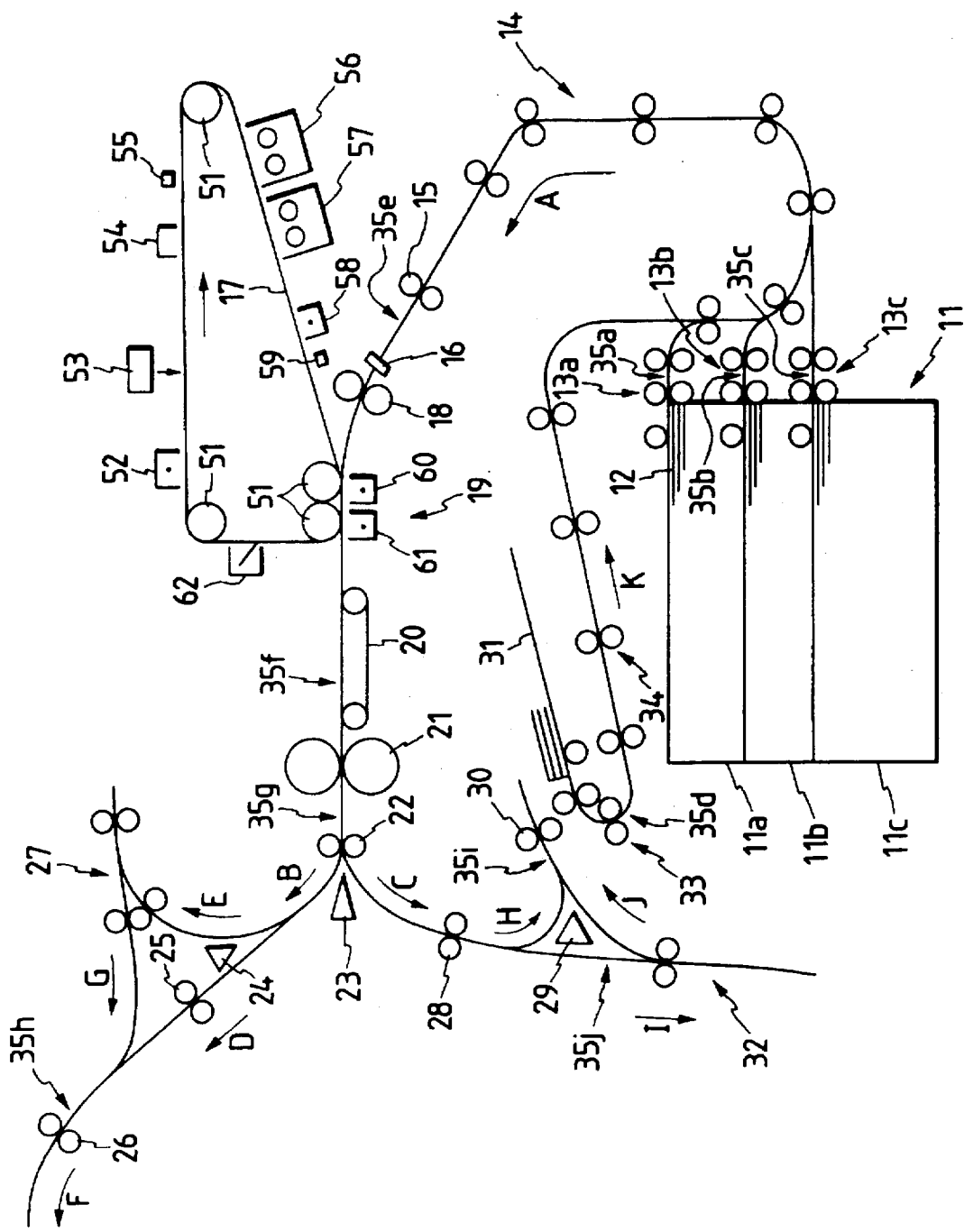
FIG. 2 is a diagram showing the basic construction of a portion including a sheet transporting mechanism and an image forming mechanism in the copying machine to be diagnosed.

FIG. 2 is a diagram showing the basic construction of a portion including a sheet transporting mechanism and an image forming mechanism in the copying machine 1 to be diagnosed.

A sheet of paper 12 is picked up from one of upper, medium, and lower sheet supply trays 11a to 11c by the corresponding one of sheet supply units 13a to 13c. The sheet picked up from the sheet tray 11 is transported along a transport path A by means of a transporting unit 14 including a plurality of transporting rollers, and is made to abut against a register gate 16 by means of a slip roller 15.

A toner image is formed on a photoreceptor 17 shaped like a belt, which turns in the direction of an arrow, by means of an image forming means based on the xerographic technique, which is to be given later. In synchronism with the movement of the toner image on the photoreceptor 17, the register gate 16 is opened and the sheet is transported, by means of register roll pair 18, to a transfer stage 19. In the transfer stage, the sheet is brought into close contact with the photoreceptor 17, and the toner image is transferred onto the sheet by means of transfer means to be given later. The sheet bearing the transferred toner image is transported, by means of a transporting belt 20, to a fusing unit 21 where the toner image is fuzed and fixed onto the sheet. Then, the sheet bearing the image fixed thereon is moved forward by a roll pair 22 located at the exit of the fusing unit 21. A gate 23, located also at the exit of the fusing unit 21, guides the sheet to one of the sheet transport paths, a path B or a path C. The gate 23 selects the path B for one-side print, and the path C for the both-side print or one-side multi-print.

The path B is further branched into paths D and E. When traveling along the path D, the sheet is transported by transporting roll pair 25 and an exit roll pair 26 in a state that the image bearing surface of the sheet is faced upward, and travels along a path F while being placed with its image bearing surface facing upward. Finally, the sheet is discharged into a discharged-sheet tray (not shown). When traveling along the path E, the sheet is turned upside down by means of an inverting unit 27 and travels along the paths G and F, and is discharged into the discharged-sheet tray in a state that the image bearing surface of the sheet faces downward.

When the sheet travels along the path C, a warp of the sheet is removed by a decurler 28, and then is moved forward along one of paths H and I. When traveling along the path H, the sheet is discharged into an intermediate tray 31 by means of a both-side print roller 30, in a state that the image bearing side of the sheet faces downward. When traveling along the path I, the sheet is turned upside down by means of an inverting unit 32, and moved forward along the path J, and finally is discharged into the intermediate tray 31, with its image bearing side facing upward.

The sheet is picked up from the intermediate tray 31 and moved forward by means of a sheet supply unit 33, and transported by means of a transporting unit 34 consisting of transporting roll pairs. Then, the sheet is further transported along the path A as in the sheet supplied from the sheet supply tray 11, and receives a toner image on the photoreceptor 17. When the image bearing side of the sheet, which is contained in the intermediate tray 31, faces downward, viz., the sheet is discharged through the path H, a new image is formed on the side of the sheet, which is reverse to the image bearing side. In this way, the both-side print is performed. When the image bearing side of the sheet faces upward, viz., the sheet is discharged through the paths I and J, a new image is additionally formed on the image bearing side, thereby realizing the one-side multi-print.

In the both-side print or one-side multi-print mode, after the second image is formed, the images are fused and fixed by the fusing unit 21 as in the one-side print mode, and the sheet is discharged into the discharging tray (not shown), as it is or turned upside down.

A number of sheet sensors 35a to 35j are disposed along the sheet transport path ranging from the sheet supply tray 11 or the intermediate tray 31 to the discharging tray. Those sensors sense presence or absence of the sheet at their sensing positions. For example, the sheet sensor 35a disposed in the sheet supply unit 13a detects the supply of the sheet from the upper sheet supply tray 11a. The sheet sensor 35g disposed immediately after the fusing unit 21 detects that the sheet passed the fusing unit 21.

The output signals from the sheet sensors 35a to 35j are applied to a central processing unit (CPU) 41 for transporting control. In response to the output signals of the sheet sensors 35a to 35j, the CPU 41 controls operations and stops of many types of drive mechanisms, such as transporting rollers, through a sheet transporting control unit 42, so that a sheet of paper is transported at given timings and speeds. The CPU 41 detects a state of blocking passage of sheet or jamming in the sheet transport path from states of the output signals of the sheet sensors 35a to 35j. In the description to follow, the places where the sheet sensors 35a to 35j are located will be referred to as jam detecting positions J1 to J10. In this instance of the embodiment, only ten sheet sensors are used and hence ten jam detecting positions are provided, for ease of explanation. Actually, if required, the copying machine may use the sheet sensors of more than ten. In this case, the machine can detect a state of jamming at many positions.

Occurrence of jam may be detected from the fact that the sheet sensor has sensed the sheet within a preset period of time counted from the start of sheet supply, no sheet has been sensed within a preset period of time following the time when the sheet sensor senses a sheet, or a sheet has passed a plurality of sensors within a preset period of time. Presence or occurrence of jam is detected every sheet sensor, and is accumulatively stored as the number of jams in a non-volatile memory contained in the CPU 41. These items of information are stored in the format as shown in Table 1, viz., as a machine history (fault log) containing jam detecting positions J1, J2, J3, ..., J10, and the number of jams $N_1$, $N_2$, $N_3$, ..., $N_{10}$. Incidentally, the term "jam detecting positions" means the positions where the jam can be detected irrespective of occurrence of the jam.

TABLE 1

| Jam detecting position | J1 | J2 | J3 | ... | ... | J10 |
|---|---|---|---|---|---|---|
| Number of jams | $N_1$ | $N_2$ | $N_3$ | ... | ... | $N_{10}$ |

The machine history contains the number of supplied sheets, average sheet-passing time at each position, the total number of copies and the like, in addition to the jam detecting positions and the number of jams.

The data of N times (e.g., several tens) of recent troubles, for example, codes K1, K2, K3, ..., KN representative of types and positions of troubles and the number of copies $L_1$, $L_2$, $L_3$, ..., $L_N$ when the troubles occur are stored as a short-term trouble history (shut-down history) in the format as shown in Table 2. A value of N ranges between 20 and 40.

For the trouble data of N times or more, old data is dumped every time new data is written. The shut-down history is reset by a service man when he carries out a maintenance of the copying machine.

TABLE 2

| Order of trouble occurrence | 1 | 2 | 3 | ... | ... | N |
|---|---|---|---|---|---|---|
| Type/position of trouble | K1 | K2 | K3 | ... | ... | KN |
| Number of copies | $L_1$ | $L_2$ | $L_3$ | ... | ... | $L_N$ |

The jam occurrence positions indicate the information on the positions where jams occur that are detected by the sheet sensors. In a case where a preset time elapses after a sheet sensor sensed presence of a sheet and the sensor still senses the sheet, it is deemed that jam has occurred at the location of the sensor. The average sheet-passing time indicates an average value of times taken for a sheet to pass from a sheet sensor to another sheet sensor.

The various information on the jam are supplied from the transport control CPU 41 to the communication controller 3. The details of the communication controller 3 will be described later.

Next, the image forming means of the xerography type for forming an image on the photoreceptor 17 will be described with reference to FIG. 2.

The belt-like photoreceptor 17 is wound around a series of rollers 51. A charging unit 52, an exposure unit 53 including a laser output scanner (ROS) and the like, a patch generating unit 54, a surface potential sensor 55, first and second developing units 56 and 57, a before-transfer corotron 58, a density sensor 59, a transfer unit 60, a separator unit 61, a cleaning unit 62, and the like are disposed around the photoreceptor 17 in this order when counted clockwise.

The surface of the photoreceptor 17 is uniformly charged, and then exposed to light of a pattern of an image to be output in the exposure unit 53. As a result, a latent electrostatic image of the output image is formed on the photoreceptor 17. The latent electrostatic image is developed by the first or second developing unit 56 or 57, so that a toner image is formed on the photoreceptor 17. The toner image is transferred onto a sheet of paper supplied from the sheet supply tray 11 by the transfer unit 60. The sheet bearing the toner image transferred thereon is peeled off the photoreceptor 17 by the separator unit 61, and transported to the fusing unit 21 by the transporting belt 20. Toner left on the photoreceptor 17 after the transfer process is removed by the cleaning unit 62, and the photoreceptor 17 is ready for the next image forming cycle.

An image input terminal for reading an image on an original document to be copied and converting it to an image signal and an automatic document feeder for automatically feeding the original document to the image input terminal, both not shown, are provided above the photoreceptor 17. The image signal from the image input terminal is supplied to the exposure unit 53 shown in FIG. 2.

Figure 3:
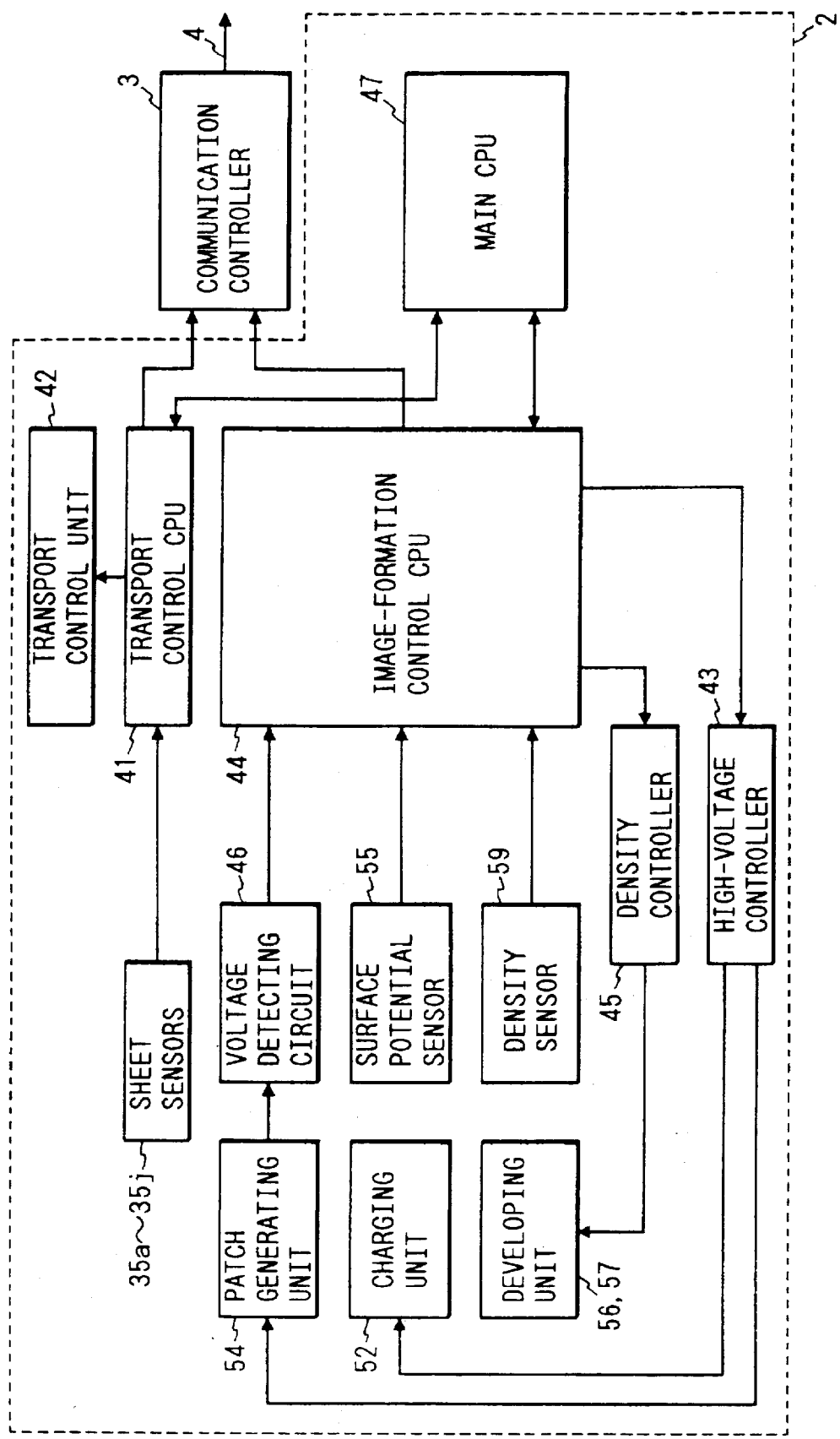
FIG. 3 is a block diagram showing the arrangement for collecting the information necessary for diagnosing the machine from the machine.

To form an image, a predetermined reference voltage is applied from a high-voltage controller 43 to the patch generating unit 54 before the image of the original is copied, as shown in FIG. 3. With the patch generating unit 54, a patch at a predetermined potential is generated on the photoreceptor 17. The patch is developed by the developing unit 56 or 57, and an optical density on the developed patch is sensed by the density sensor 59. The output signal of the density sensor 59 is supplied to an image-formation control CPU 44. The CPU 44 controls a density controller 45 so that the sensed density is equal to a preset reference density. Specifically, the developing bias voltage, quantity of supplied toner, and the like are controlled in the developing units 56 and 57.

A surface potential on the other area on the photoreceptor 17 than the patch portion is sensed by the surface potential sensor 55. The output signal of the surface potential sensor 55 is supplied to the CPU 44. The charging unit 52 and the like are controlled through the high-voltage controller 43 so that the sensed surface potential is equal to a preset reference potential.

The copy of the original image is carried out under the image forming conditions initially set as described above.

A voltage applied to the patch generating unit 54 is detected by a voltage detecting circuit 46, and data representative of the voltage applied to the patch generating unit 54 is transferred to the image-formation control CPU 44.

The data representative of the developing density, the surface potential of the photoreceptor 17, and the voltage applied to the patch generating unit 54 are transferred from the CPU 44 to the communication controller 3.

The transport control CPU 41 and the image-formation control CPU 44 are connected to a main CPU 47. In response to an instruction from the main CPU 47, the sheet transporting operation by the CPU 41 is carried out in synchronism with the image forming operation by the CPU 44, thereby to effect the copying operation.

The communication controller 3 receives information on the sheet transporting operation from the transport control CPU 41 and information on the image forming operation from the image-formation control CPU 44, and stores both the information. The communication controller 3 checks if a trouble occurs in the copying machine. If a trouble occurs, the controller 3 sends through the communication line 4 to the host computer 5 (FIG. 1) all of the information stored therein as well as identifying codes (determined trouble ID) representing the position and the type of trouble.

The information sent from each copying machine 1 to the host computer 5 contains the model name of the copying machine, serial number, client's name, output statuses of the sensors. These items of data are transferred in the form of packet represented by binary data.

The host computer 5 converts the various binary data received from the copying machine 1 into data file expressed by the ASCII codes, and sends it to the shell 8 in the expert system server 6. The shell 8 converts the data file into a hash table. The knowledge base system 7 picks up data necessary for diagnosis from the hash table.

Next, the construction of the knowledge base system 7 for diagnosis will be described with reference to FIG. 4.

In this instance of the embodiment, the knowledge base system 7 includes a basic fact base 71, a common symptom base 72, an individual case base 73, and a hypothetical trouble case base 74. These knowledge bases will be described hereinafter.

The basic fact base 71 stores the facts obviously known from the basic principles. How to discover the causes of the determinate troubles and how to deal with the troubles are determined on the basis of the knowledge from the basic fact base 71. The term "determinate trouble" will be described later. The common symptom base 72 stores the statistically processed symptoms proper to a certain type of the machines. Specifically, phenomena observed in a certain type of the copying machines and relationship between different phenomena are statistically processed to find the symptoms common to this type of the copying machines. These common symptoms are stored by the common symptom base 72. The individual case base 73 stores the statistically processed, special symptoms proper to individual copying machines. Special information on defective parts is stored in the individual case base 73. The hypothetical-trouble case base 74 stores trouble cases possibly to happen in a certain type of copying machines. A "trouble predicting diagnosis" to be given later is carried out by applying these cases to the copying machines to be diagnosed and verifying the resultant facts.

The knowledge base system 7 further includes a learning mechanism 75, a trouble verifying mechanism 76, a hypothetical-trouble sustaining mechanism 77, and a trouble analysis mechanism 78.

The learning mechanism 75 analyzes data gathered by observing the copying machines, and learns and stores the necessary data. Most of the items are determined in advance as to whether they are to be learned or not. The items of high correlation score to be given later are sometimes determined anew. The learning mechanism 75 includes an input information analysis mechanism 75-1 and a hypothetical-trouble generating mechanism 75-2. The input information analysis mechanism 75-1 analyzes input information received from an input/output mechanism (not shown), namely, machine information P, and statistically processes the information to be stored as common symptoms. Further, it updates the common symptom base 72 and stores the common symptoms therein. The individual machine information on the machine are retained in an internal work area till the diagnosis session ends, viz., an alert output to be given later is generated. The individual machine information, particularly those of the machines to continuously be observed are stored in the individual case base 73 after it is updated. Whether the continuous observation is required or not is automatically determined according to the previously prepared rules by the expert system. Specifically, when the copying machine diagnosed exhibits symptoms different from the common symptoms, it is determined that the machine is exceptional, and thence it must be continuously observed.

When the input information contains the determinate trouble ID, the determinate trouble T1 is transferred to the trouble analysis mechanism 78 to be given later. The determinate trouble ID is set up in advance according to the type of trouble. When a trouble actually occurs in the copying machine, the determinate trouble ID is generated in the machine.

When the determinate trouble ID is contained in the input information, the hypothetical-trouble generating mechanism 75-2 reversely computes the contents stored in the various case bases to read a transitional process of the symptom through which the determinate trouble is caused. The symptoms immediately before the trouble occurs are categorized to form a set X. Here, a new hypothetical trouble H is generated. The set X is used as a logical conclusion element when the hypothetical trouble H is proved. Both of them are added to the hypothetical trouble case base 74 to update it. The processing of this will be subsequently described in detail.

The trouble verifying mechanism 76 is provided for verifying whether the hypothetical trouble in the hypothetical trouble case base 74 is a true trouble or not. The trouble verifying mechanism 76 includes rules and data (to be given later) necessary for decision.

The trouble verified as a true trouble by the trouble verifying mechanism 76 is output as a determinate trouble T2, and is transferred to the trouble analysis mechanism 78. The determinate trouble T2 is transferred to a correlation analysis mechanism 75-2a. Another trouble of a high correlation score is transferred as a candidate for a new trouble to the trouble verifying mechanism 76. When the candidate is determined as a new trouble, it is added as a new hypothetical trouble to the hypothetical trouble case base 74, through the hypothetical-trouble sustaining mechanism 77.

The hypothetical-trouble sustaining mechanism 77, which includes a hypothetical-trouble-order determining mechanism 77-1, is provided for efficiently updating the hypothetical trouble case base 74 all the time. The hypothetical-trouble-order determining mechanism 77-1, which includes necessary rules and data, determines a priority level of the trouble to be verified on the basis of a significance level of the trouble and a frequency of trouble occurrence.

The trouble analysis mechanism 78 is for generating an alert output Q for locating the causes of the determinate troubles T1 and T2, when receiving them, and for determining measures against the troubles by using the basic fact base 71. The trouble analysis mechanism 78 includes a trouble shooting mechanism 78-1 containing the rules and data necessary for discovering the cause, and a measure determining mechanism 78-2 containing the rules and data necessary for determining the measures. The rules and data employed in the trouble shooting mechanism 78-1 and the measure determining mechanism 78-2 are general rules and data that can be inferred from the experiences thus far made.

Next, the diagnosis operation based on the knowledge base shown in FIG. 4 will be described. The diagnosis operation starts when data indicative of trouble (determinate trouble ID) appears in the information indicating an operating status of the copying machine, that is, diagnosed-machine information P, or starts periodically. In some cases, it is started manually by a client or a service man.

Figure 5:
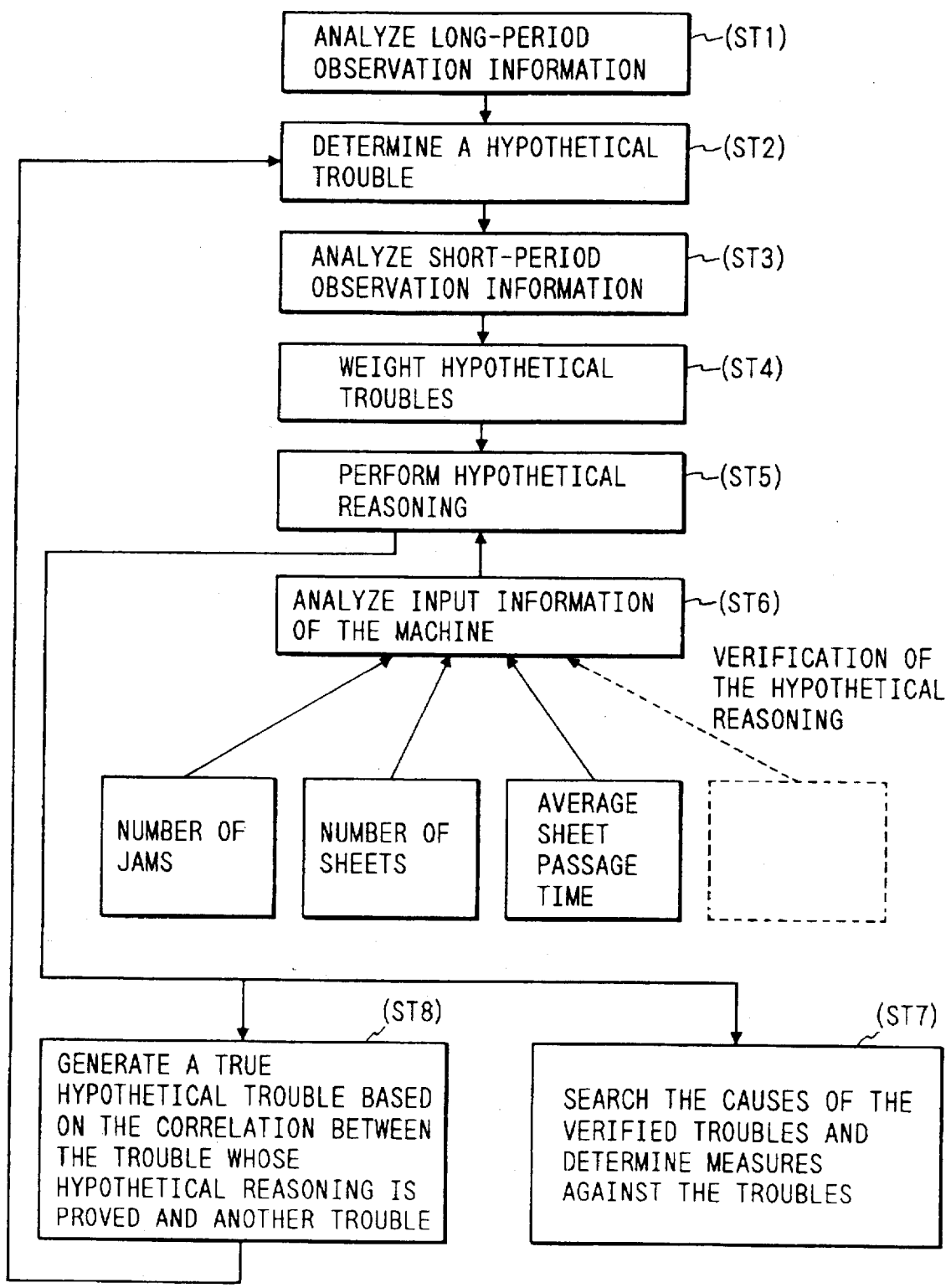
FIG. 5 is a flow chart showing sequential steps of a diagnosis process for diagnosing the copying machine.

An outline of the diagnosis process when the copying machine is diagnosed will be described with reference to FIG. 5. The details of each process step will subsequently be described.

First, long-period observation information is analyzed (in step ST 1). The long-period observation information means various types of information, which are accumulatively collected from all the diagnosed copying machines for a long period. In other words, the long-period observation information means the diagnosis results of diagnosing the machines a satisfactory number of times. In some machines, trouble positions and trouble types can statistically be predicted when using the long-period observation information.

Then, a hypothetical trouble is determined on the basis of the results of analyzing the long-period observation information (ST 2). The "hypothetical trouble" means a trouble to possibly occur in a certain type of copying machine when it is diagnosed. The hypothetical trouble is determined on the basis of the results of diagnosing the long-period observation information. In a case where the analysis results show that jam tends to occur at a specific position in a certain type of copying machine, even if at present, no jam occurs in the machine, the jam will occur there at a high probability. Accordingly, the jam to occur at this specific position is determined to be a hypothetical trouble of the highest priority. Other troubles are also priority ordered according to a frequency of occurrence of them when viewed as a whole.

Short-period observation information is then analyzed (ST 3). The short-period observation information means the latest information within a limited period of the information collected from the respective copying machines. Since the short-period observation information corresponds to the shut-down history as already referred to, the short-period observation information contains the latest information of the respective copying machines. Accordingly, one can know the latest operation history of the copying machine to be diagnosed from the short-period observation information.

The hypothetical troubles determined in step ST 2 are weighted on the basis of the short-period observation information (ST 4). The weighting of the hypothetical trouble is made in order that in the hypothetical reasoning to be given later, it is realize to infer the cause of a trouble in each copying machine for a minimum time.

The weighted hypothetical troubles are hypothetically reasoned according to the significance level and the frequency of trouble occurrence (ST 5). The significance level and the frequency of trouble occurrence are also weighted in accordance with a degree of influence affected by a trouble when it occurs. Accordingly, the causes of the troubles are reasoned according to the degree of the influence. The hypothesis is verified by analyzing the input information of the copying machine under diagnosis (ST 6). The copying machine is investigated about the number of jam occurrences, the number of supplied sheets, average sheet passing times, and the like. According to a diagnosis algorithm previously prepared, the system verifies whether or not the predicted trouble is proper, viz., it has actually occurred, or whether or not the probability that the predicted trouble will occur is high. The verification is performed by a preset number of troubles in the order of the trouble occurrence probability of the hypothetical troubles. The verified hypothetical troubles are each assigned a value between 0 to 100, which represents a level of probability. The system clears up the cause of the hypothetical trouble and determines a measure for the trouble (ST 7). The system generates a new hypothetical trouble which is a trouble having a high correlation score in connection with the verified hypothetical trouble is treated as a new hypothetical trouble (ST 8), and then returns to step ST 2. The details of the diagnosis algorithm will be described later.

The diagnosis as mentioned above is applied to all the copying machines when a trouble occurs in a copying machine. The long-period observation information and the short-period observation information are successively updated. Accordingly, the long-period observation information contains the symptoms common to all the machines. The short-period observation information contains the symptoms proper to the respective machines. Troubles apt to occur in the type of the copying machines can be predicted from the common symptoms. Accordingly, trouble occurrence can be prevented in advance if a service man replaces related parts with new ones and adjusts the position of the machine where trouble possibly occurs in a periodical inspection.

The details of the diagnosis will be described with reference to FIG. 4 hereinafter.

A machine under diagnosis, or a copying machine 1, supplies machine information P as input information to the input information analysis mechanism 75-1 of the learning mechanism 75. The machine information P is input when a value of each item of information representing the operating status of the copying machine 1 exceeds a preset value. The input information contains jam position, the number of jam occurrences, the number of supplied sheets when the trouble occurs, an average sheet passage time at each location, serial number of the machine, the total number of copies, the surface potential of the photoreceptor, patch generator potential, copy density, and the like. The input information analysis mechanism 75-1 analyzes those items of information. The input data analysis will be described in detail.

In analyzing the input information, the input information analysis mechanism 75-1 adds up the number of jam occurrences, the number of supplied sheets, and the like at each location every time the diagnosis is carried out, and retains the results. A variance of jam occurrences is statistically calculated from the information retained. More specifically, the statistics of the following items are gathered every diagnosis.

1) Total number of jam occurrences at each jam position
2) Total number of supplied sheets at each jam position
3) Standard deviation in the jam occurrences
4) Deviation value based on the standard deviation
5) Average occurrence rate of jams at each position
6) Average sheet passage time The common symptom base 72 is updated and stores the statistical symptoms common to the type of the machines, or the nature thereof.

The information of the individual diagnosed machines, or the copying machines, are retained in the work area provided in the input information analysis mechanism 75-1 till one diagnosis is completed. For the copying machine particularly requiring a continuous observation, the individual case base 73 is updated and stores the individual machine information. The copying machine particularly requiring a continuous observation indicates the copying machine exhibiting exceptional symptoms, different from the common symptoms.

When the input information contains the determinate trouble, the determinate trouble T1 is transferred to the trouble analysis mechanism 78. Since first-hand data gained from the copying machine contains the data not requiring the trouble analysis, only the necessary data is selected from the first-hand information, and the determinate trouble ID is added to the selected one to form the determinate trouble T1.

How to analyze the input information will be described in detail.

The "total number of jam occurrences at each jam position" referred to in item 1) above of which the statistics are taken will be described. As shown in Table 2, it is checked, every diagnosis, as where the jam occurred. In the table, a circle symbol indicates a jam position where the jam occurred. At the jam position the accumulated number of jams is stored in that diagnosis.

TABLE 3

| | Jam detecting position | | | | | |
|---|---|---|---|---|---|---|
| Number of diagnoses | J1 | J2 | J3 | ... | J10 | Number of identified jam positions |
| 1st | o | o | | | o | 3 |
| 2nd | | o | o | | o | 5 |
| 3rd | | | o | | | 5 |
| . | | | | | | . |
| . | | | | | | . |
| $(M-1)^{th}$ | | | o | | | 9 |
| $M^{th}$ | | | | | o | 10 |

In the instance of Table 3, jams occur at three jam detecting positions J1, J2, and J10 in the first diagnosis. In the second diagnosis, jam occurs at the jam detecting position J2 and other two positions, totally at three positions. The total number of confirmed jam positions is five. Subsequently, jam occurrence positions are confirmed for each diagnosis in a similar way. In the Table 3 instance, jam occurrence is confirmed at all the jam detecting positions, or ten positions, at the Mth diagnosis counted from an instant that the contents of the short-term trouble history is reset by a service man.

The information (of the latest M number of diagnoses) on the number of jam occurrences shown in Table 3, together with the data representative of the number of jam occurrences at each position, are time-sequentially loaded into the buffer. Every time the diagnosis is carried out, the oldest data is discharged for dumping purposes. The memory capacity of the buffer is selected in consideration of the average number M of diagnoses at which jam will be confirmed at all the jam detecting positions (ten positions in this instance of the embodiment). The value of M is preferably at least 100. The buffer under discussion is contained in the common symptom base 72 shown in FIG. 4, and the information in the buffer corresponds to the short-period observation information.

The number of jams occurred at the jam detecting positions J1 to J10 are accumulatively stored, as the long-period observation information and the total number of jams, in the memory area provided separately from the buffer storing the information of Table 3, every diagnosis.

When these items of information are collected from a number of copying machines of a certain type for a long period, viz., a satisfactory number of diagnoses, e.g., approximately 1000 number of diagnoses, are carried out, one can know types of troubles to commonly occur in this type of copying machines from those items of information. Thus, the system can learn not only the nature proper to a specific machine but also the characteristics common to a certain type of machines. It is possible to predict the positions of a certain type of the machine where jam tends to occur on the basis of the learning results. Accordingly, a hypothetical trouble can be generated as will be described later.

In some cases, when the learning made simply from the information of all of the jams at each position is used, a problem arises. The problem will be described hereinafter.

It is assumed now that immediately after a copying machine is installed, jam occurs many times at the jam detecting position J1. The learning mechanism 75 in FIG. 4 learns that jam is apt to occur at the jam detecting position J1. Subsequently, the learning mechanism 75 diagnoses the machine using the learning result. If the diagnosis indicates that the cause of the jam is an initial trouble of the part, and the defective part is replaced, then occurrence of trouble will be reduced at the position. However, judging from the trouble history, the system still decides that jam is apt to occur at the jam detecting position J1. Accordingly, a hypothetical trouble will be generated according to the priority order based on the system decision and the hypothetical reasoning will be performed. Thus, in spite of the fact that the status of the machine has been changed from the initial status till the replaced parts becomes defective, the hypothetical reasoning is performed on the basis of the old knowledge. Consequently, much time is taken till the cause of the trouble is found.

To cope with the problem, in the instant embodiment, the input information is classified into long-period observation information and short-period observation information. The priority order or level of the hypothetical trouble is determined on the basis of the short-period observation information. Accordingly, after a measure is taken for a trouble in a copying machine, the hypothetical trouble for the trouble is given a low priority level. Therefore, no futile hypothesis will be verified.

When the determinate trouble ID is contained in the input information, the hypothetical-trouble generating mechanism 75-2 of the learning mechanism 75 reversely computes the contents stored in the various case bases, such as the common symptom base 72 to read a transition of the symptom through which the trouble has been caused. Only necessary symptoms are selected from among various symptoms just before the trouble occurs, thereby to form a set X.

Figure 6:
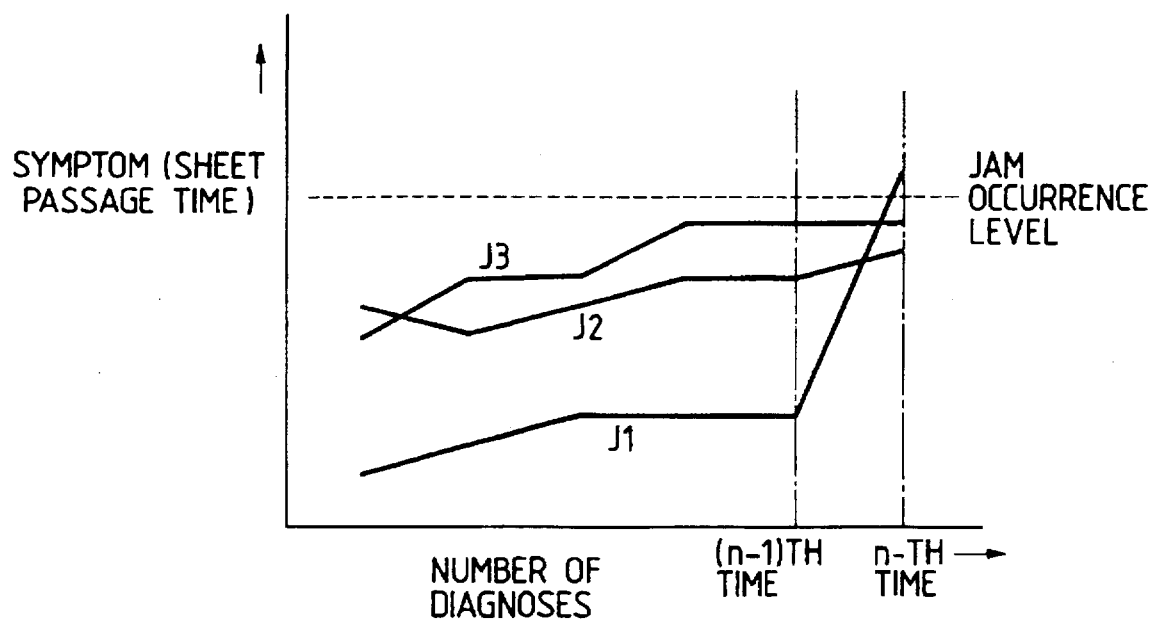
FIG. 6 is a graph useful in explaining the generation of a hypothetical trouble.

For example, a history of the symptoms of jam occurrences at the respective jam detecting positions is stored as the short-period observation information in the common symptom base 72. The history may be illustrated as shown in FIG. 6. When a determinate trouble ID indicating jam occurrence is detected at the n-th diagnosis, the system reads a variation of the contents in the common symptom base 72 at the (n−1)th diagnosis. In the case of FIG. 6, when it is detected that jam occurs at the jam detecting position J1, the sheet passage times at other jam detecting positions J2 and J3 are read as symptoms. The sheet passage times at these jam detecting positions form the set X. A new hypothetical trouble corresponding to the set X is defined as a hypothetical trouble H. At this time point, the hypothetical trouble H is in name only, and not hypothetical. The set X and the hypothetical trouble H are added to the hypothetical trouble case base 74 and the base is updated.

The trouble verifying mechanism 76 verifies whether or not the hypothetical trouble is a true trouble while referring to the hypothetical trouble case base 74, viz., whether or not the hypothesis is correct. The decision process for the verification will be described with reference to a trouble verifying tree shown in FIG. 7.

Figure 7:
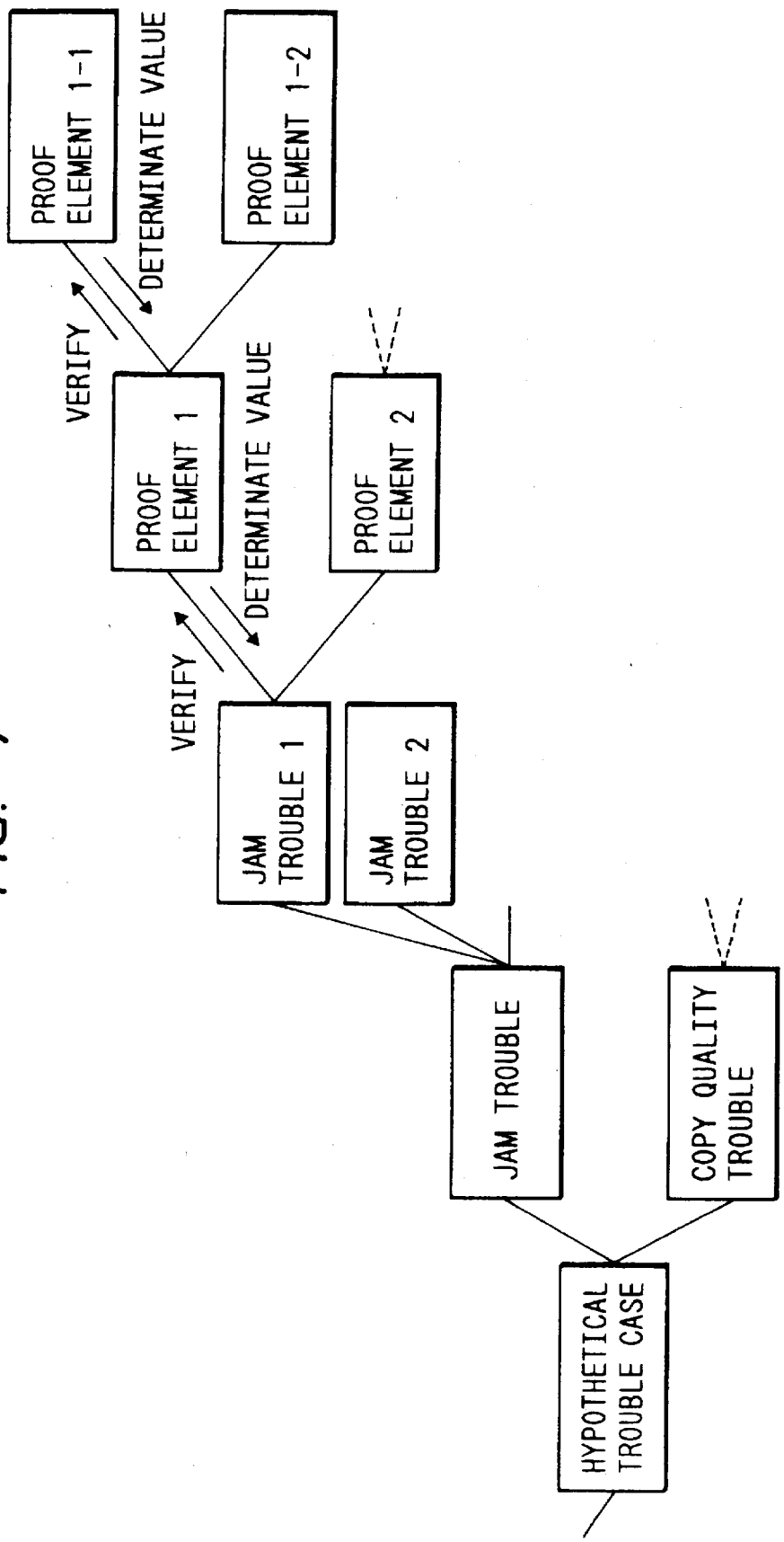
FIG. 7 is a diagram showing a model of a verifying logic based on a hypothetical trouble case base.

FIG. 7 is an explanatory diagram showing a model of a verifying logic in the trouble verifying mechanism 76, which is based on the knowledge base of the hypothetical trouble case base 74. The knowledge bases of the hypothetical trouble case base 74 and the like are all designed in the object oriented style. Therefore, all of the knowledge and the rules are prescribed in the objects. The object consists of a plurality of slots. The data and rules necessary for the verification are retained in the slots. The operation of the trouble verifying mechanism 76 will be described placing emphasis on the jam trouble. The term "object" means the frame of the frame language.

In FIG. 7, the hypothetical trouble is categorized into "jam trouble" and "copy quality trouble". The "jam trouble" consists of a plurality of troubles "jam trouble 1", "jam trouble 2", . . . . The "jam trouble 1" holds on the basis of two logical conclusion elements, "proof element 1" and "proof element 2". The hypothesis of the proof element logically leads to two conclusion elements, "proof element 1-1" and "proof element 1-2". The "jam trouble 1", "jam trouble 2", . . . correspond to the jam occurrence positions, respectively. The "proof element 1" and "proof element 2" correspond respectively to a jam occurrence seriousness level, a jam increase seriousness level, a number-of-jam seriousness level, and a jam deviation significance level, which are to be given later.

In FIG. 7, "hypothetical trouble case", . . . , "proof element 1-2", which are each enclosed by a rectangular frame, indicate objects. Each object retains necessary data in the slots thereof. The necessary data is retained in the method slot thereof.

The method contained in each object is started up by a message received from another object. It is the trouble verifying mechanism 76 that boots the method, viz., controls the verification of the transmission of the message, for example.

How to verify the "jam trouble 1" will be described by way of example. In the verification, the "proof element 1" and the "proof element 2" are tested as to whether or not those elements hold. To test them, a message "verify" is sent to the two objects, "proof element 1" and "proof element 2". When receiving the message "verify", the "proof element 1" and "proof element 2" each boots the method corresponding to the message, to determine whether or not the proof elements hold. At this stage, the "proof element 1" and "proof element 2" do not yet determine whether or not the elements hold, and send the same message to the objects of the lower rank in the hierarchy which should prove the objects themselves, e.g., "proof element 1-1" and "proof element 1-2".

In this way, the objects of the lowest rank are reached, the objects return the results to the higher ranking objects. When receiving the results, the higher ranking objects sums the results received from the lower ranking objects, to decide the right and wrong of the objects themselves and returns the decision results to the higher ranking objects. In this way, the "jam trouble 1" is verified.

In making the proof, each object returns to the higher ranking object the right/wrong in terms of a determinate value between 0 to 100, not a binary or two-level value. The higher ranking decides the determinate value of the object itself in consideration of the plural results and the determinate values associated with the results. Finally, the "jam trouble 1" is attendant with the determinate value between 0 and 100, and the verification result of the trouble of the machine under diagnosis is inferred. As the determinate value of the verification result approximates to 100, the probability of trouble occurrence becomes higher. As it approximates to 0, the probability become lower.

Specific examples of the "proof element 1" and "proof element 2", which are objects ranked lower than the "jam trouble 1", will be described. In the instant embodiment, four types of severity of the proof elements, "jam rate severity", "jam increment severity", "jam number severity", and "jam T-score severity" are located at the rank lower than the "jam trouble 1". A jam trouble level necessary for determining the jam trouble is obtained from those types of severity. While a general trouble verification tree is illustrated in FIG. 7, the "proof element 1" is attendant with only one proof element in the description to follow.

The respective types of severity will be described hereunder.

(1) Jam rate severity (X1)

The jam rate severity is expressed by the following functions, with an argument which is a jam occurrence rate j/f where the total number j of jams having occurred at a position till now and f is the present number of supplied sheets at the position.

X1=0 when f=0

X1=j/f×10000 when f≠0

X1=100 when X1>100

This value is computed using the total number of jams which are found in the short-period observation information (shut-down history) but also obtained by entirely inspecting the long-period observation information (fault log).

(2) Jam increment severity (X2)

Attention is paid to the number of supplied sheets $N_{P1}$, $N_{P2}$, and $N_{P3}$ at the recent three jam occurrence points $T_1$, $T_2$, and $T_3$. The number of supplied sheets $\Delta A$ (=$N_{P2}-N_{P1}$) from time point $T_1$ where jam occurs to time point $T_2$ is compared with $\Delta B$ (=$N_{P3}-N_{P2}$) from time point $T_2$ to time point $T_3$. It is seen that the jam occurrences increase or decrease depending on the length of the jam occurrence interval resulting from the comparison. This tendency is expressed in terms of a jam increment severity X2. The jam increment severity X2 is mathematically given by the following expressions. A large value of the jam increment severity X2 indicates an increase of jam occurrence frequency. Only the jams found in the shut-down history are used for computing the value of the jam increment severity X2.

$X2=0$ when $\Delta B=0$ $X2=(\Delta A/\Delta B-1.0)\times 100$ when $\Delta A \neq 0$ $X2=100$ when $X2>100$ $X2=0$ when $X2<0$ (3) Jam number severity (X3)

The jam number severity X3 is given by the following expressions. In the expressions, $N_j$ is the number of jams. As the value $N_j$ is larger, a probability that the system determines that a trouble occurs in the machine, becomes higher. Only the jams found in the shut-down history are used for computing the value of the jam number severity X3.

$X3=100$ when $N_j \geq 5$ $X3=a \times N_j^3 + N_j$ when $N_j < 5$ (4) Jam T-score severity (X4)

A standard deviation on the jam occurrences using the number of jams at each position is obtained. Then, the deviations S at the respective positions are obtained. When the deviation S is applied to the following equations, then we have the jam T-score severity X4. This value is computed in consideration of not only the jams found in the shut-down history and but also all the jams obtained by entirely inspecting the fault log. The jam T-score severity X4 is computed using the information on all the machines thus far diagnosed. While the other three types of severity X1, X2, and X3 are based on the information of the individual machines, for diagnosis and evaluation purposes, the jam T-score severity X4 is used for the diagnosis/evaluation common to a certain type of the copying machines.

$X4=100$ when $S>75$ $X4=0$ when $S<25$ $X4=2\times(S-25)$ when $25 \leq S \leq 75$ The jam T-score severity X4 is used in order that of those jams occurring at the respective positions, the jam leading to occurrence of the trouble at the highest probability is first dealt with.

Those severity X1, X2, X3, and X4 are weighted as in the following relations, thereby to obtain a jam trouble level Y necessary for the jam trouble determination.

$Y=(X1 \times n1 + X2 \times n2 + X3 \times n3 + X4 \times n4)$ where $0 \leq Y \leq 100$, $0 \leq n1 \leq 1$, $0 \leq n2 \leq 1$, $0 \leq n3 \leq 1$, $0 \leq n4 \leq 1$, $n1+n2+n3+n4=1$, $0 \leq X1 \leq 100$, $0 \leq X2 \leq 100$, $0 \leq X3 \leq 100$, $0 \leq X4 \leq 100$.

The right or wrong of the hypothetical trouble is determined on the basis of the jam trouble level Y thus obtained. That is, the hypothesis is verified. When the jam trouble level Y is a preset value or more, the hypothetical trouble is determined to be the true trouble, and is treated as a determinate trouble.

While the verification of the hypothesis on the jam has been described in detail, the hypothesis on the copy quality and other items can be verified in a similarly way. A plurality of trouble cases stored in the hypothetical trouble case base 74 are successively subjected to the hypothesis verification. Specifically, a predetermined number of hypothetical troubles are subjected to the hypothesis verification in the priority order preset by the hypothetical-trouble-order determining mechanism 77-1 of the hypothetical-trouble sustaining mechanism 77. The determinate trouble T2 thus determined is transferred to the trouble analysis mechanism 78.

The trouble T2 determined in the trouble verifying mechanism 76 is transferred to the hypothetical-trouble generating mechanism 75-2 (route R(1)) in order to gain a true trouble by taking the correlation of the determinate trouble with another trouble. The correlation analysis mechanism 75-2a provided in the hypothetical-trouble generating mechanism 75-2 analyzes the correlation between the troubles and between the symptoms, and the like, that is, obtains every diagnosis the correlation of the occurrence of a certain trouble with another trouble or a symptom by the regression analysis. The trouble of a high correlation score is transferred to the trouble verifying mechanism 76 (route R(2)) where it is verified whether or not it is a true trouble.

To find such a true trouble cause that cannot be predicted from a manifest trouble, the correlation of a certain trouble with another trouble or symptom is obtained.

It is assumed now that jam frequently occurs at the position (jam detecting position J7) of the fusing unit 21 of the copying machine shown in FIG. 2. In this case, it seems that something is wrong with the fusing unit 21. Then, a service man takes against the trouble such measures that parts of ore related to the fusing unit 21 are replaced with new ones or adjustment of the fusing unit is made. In some type of trouble, the measure fails to remove the trouble. The reason for this is that the true cause of the trouble is hidden. The hidden trouble true cause will be described.

A sheet of paper is supplied from the sheet supply tray 11 reaches the fusing unit 21 after passing through a predetermined sheet transport path. The sheet passes at improper times at the respective positions before it reaches the fusing unit 21. It is assumed that a delay of the sheet passage time at the upper sheet supply tray 11a is 20 ms, delays of it at points J5 and J6 when the sheet is transported are 1 ms and 2 ms both being within a tolerable range, the delay at the fusing unit 21 is 10 ms, a tolerable delay time at the sheet supply tray 11a is 25 ms, and a tolerable delay time at the fusing unit 21 is 30 ms. In this case, at the positions upstream of the fusing unit 21, the delay of the sheet passage time is within the tolerable range, so that no jam is detected. However, as the sheet travels, the delay time is accumulated. When the sheet reaches the fusing unit 21, the total delay is 33 ms. This figure exceeds the tolerable delay time 30 ms. As a result, the sheet sensor 35g senses a jam. Careful examination of the delays shows that the largest delay is caused at the sheet supply tray 11a. Therefore, if this delay is small, no jam will not be detected at the fusing unit 21. Thus, the true cause of the jam detected at the fusing unit 21 lies in the sheet supply tray 11a. Therefore, some measure should be taken against this position. However, the conventional diagnosis system cannot find the true cause of such a trouble.

Figure 8:
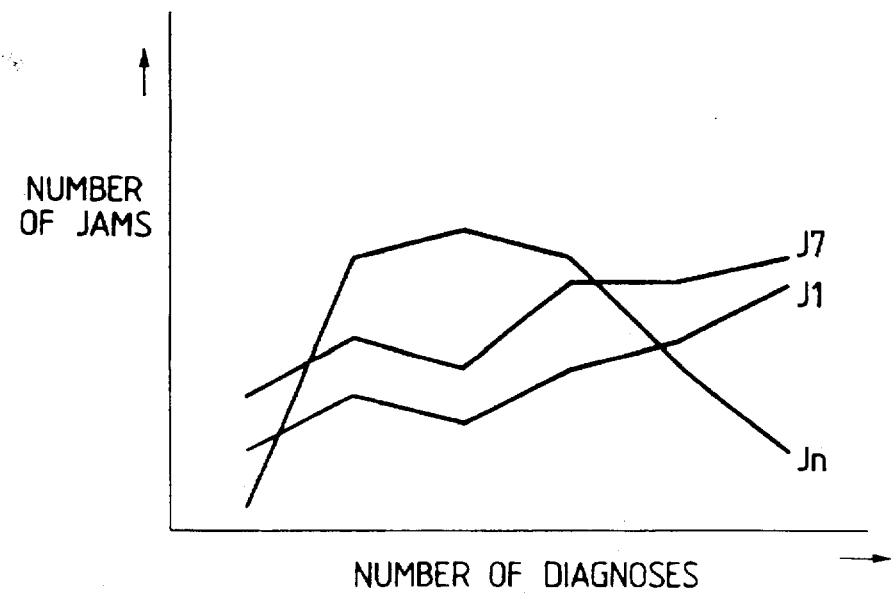
FIG. 8 is a graph showing the correlation analysis.

In the case under discussion, the delay time at the sheet supply tray 11a is the largest. Accordingly, it is predicted that jam will occur not only at the position (jam detecting position J7) of the fusing unit 21 but also at the position (jam detecting position J1) of the sheet supply tray 11a although a less number of jams occurs at the later. In other words, it can be expected that a positive correlation exists between the jam detecting positions J7 and J1, as shown in FIG. 8. In the figure, Jn indicates a jam detecting position having no correlation in connection with another trouble.

In the present embodiment, when a trouble occurs at a certain position, a correlation of the trouble with another trouble occurring concurrently with the former or a symptom at that time is calculated by using the regression analysis. The trouble of a high correlation score is treated as a new hypothetical trouble.

In the above instance, when a jam occurs at the position of the fusing unit 21, the jam at the position of the sheet supply tray 11a exhibits a high correlation score. Accordingly, the jam at the position of the sheet supply tray 11a is additionally enrolled as a new hypothetical trouble.

To detect the correlation, the following simple regression analysis, for example, is used.

Assuming that an n number of paired data items $(X_1, Y_1)$, ..., $(X_n, Y_n)$ are obtained, a regression of data Y for data X is expressed by $$y - \bar{y} = \frac{S(xy)}{S(xx)} (x - \bar{x})$$

where $S(xy) = \Sigma(y_1 - \bar{y})(x - \bar{x})$
$S(xx) = \Sigma(x - \bar{x})^2$ Here, a correlation coefficient r is given by $$r = \frac{S(xy)}{\sqrt{[S(xx)S(yy)]}}$$

where $S(yy) = \Sigma(y - \bar{y})^2$

The trouble of 0.5 or more as the score of the correlation coefficient is treated as a candidate for a trouble having a correlation. The system further determines the symptom of that trouble in the long-period observation information, and adjusts it so that it falls within a certain range below a determinate value of the trouble on which the correlation is based on. Concretely, if the trouble obtained from the correlation actually occurs in the machine, a maximum value is assigned to the determinate value. If an actual trouble does not yet occur, but a symptom of the trouble is present, a medium value is assigned to the determinate value. In the case other than the above two cases, a minimum value is assigned to the determinate value.

As described above, the trouble induced from the correlation is determined to be a new trouble by the trouble verifying mechanism 76. It is transferred, as a determinate trouble T2, from the learning mechanism 75 to the trouble analysis mechanism 78, as in the normal determinate trouble T1, and also to the hypothetical-trouble sustaining mechanism 77 (route R(3)).

In the hypothetical-trouble sustaining mechanism 77, the hypothetical-trouble-order determining mechanism 77-1 determines the priority level of the new hypothetical trouble, and updates the hypothetical trouble case base 74. The priority level is determines depending on a significance and a frequency of the trouble, for example. Basically, it becomes higher as the significant or the frequency of the trouble becomes higher. The significance and the frequency are weighted. To the trouble of which the frequency is high but the significance is low, a low priority level is assigned. The term "significance of the trouble" means a degree of influence of a trouble, when it occurs, affected to the users. The hypothetical-trouble sustaining mechanism 77 is operated, every diagnosis, to determine the priority order depending on a frequency of the trouble, regardless of whether or not the trouble having a correlation is present.

The parameters to determine the priority order are the significance and the frequency of the trouble. The significance is determined in advance as an alert category according to the type of a trouble.

The priority order is determined in the following way.

The significant alert category generally consists of plural levels, e.g., six levels. The frequency is statistically processed in the form of a deviation value of the trouble occurrences. To determine the priority order, the significance hierarchy of six levels (trouble significance levels 1 to 6) are preferentially considered, and when the parameters are within the range of the same significance level, the deviation values thereof are compared. The troubles are presented in the order of priority level and in the form of a list in a specific area of the case base.

In the trouble analysis mechanism 78, the trouble shooting mechanism 78-1 locates the causes of the determinate trouble T1 from the learning mechanism 75 and the determinate trouble T2 from the trouble verifying mechanism 76 by using the basic fact base 71. The measure determining mechanism 78-2 determines the measures to eliminate the troubles. An alert output Q is generated according to the contents of the determination. The trouble shooting mechanism 78-1 and the measure determining mechanism 78-2 are of the know type, and respectively locates the causes of troubles and determines the measure to eliminate the causes by using the known facts. Specifically, for a trouble that no image is printed on a sheet of paper, the trouble shooting mechanism presents failures of the charger, exposing unit, developing units, and transfer unit, and using-up of toner, as the candidates for the trouble. The measure determining mechanism gives instructions to inspect the functional units of the machine and to supply toner.

The alert output Q contains the information of machine-type indicating codes, e.g., the serial number of the copying machine under diagnosis, "symptom" indicative of the symptom on the present status of the machine, "cause" indicating the cause from which the "symptom" would be caused or position information, and diagnosis information, e.g., "measure" as proper measure instruction information. The alert output Q is returned from the knowledge base system 7 through the shell 8 to the host computer 5.

The diagnosis information is sent to the host computer 5 where it is stored as a file, and is output by a printer when necessary. The diagnosis information is sent from the host computer 5 through the communication line 4 to the communication controller 3. The diagnosis information are taken out of the communication controller 3. A service man can know "symptom", "cause" and "measure" from the diagnosis information. On the basis of the diagnosis information, he can know troubles to possibly occur in advance and take preventive measures against the future troubles. Good service can be presented to users.

2nd Embodiment

Another diagnosing apparatus for diagnosing electronic terminal devices and diagnosing method using the diagnosis apparatus according to the present invention will be described with reference to FIGS. 9 through 26. In the embodiment to be given hereinafter, the terminal device is a copying machine, and how to diagnose the copying machine on a copy quality trouble thereof by the diagnosis apparatus and the diagnosing method will be described by way of example.

Figure 9:
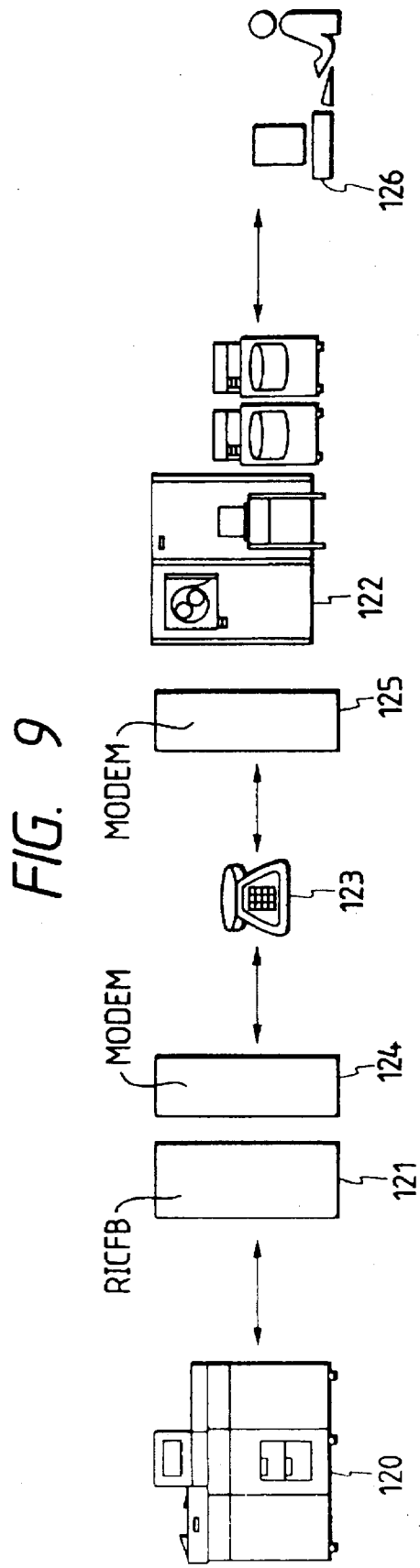
FIG. 9 is a diagram showing the basic construction of a diagnosing system for a copying machine according to another embodiment of the present invention.

FIG. 9 is an explanatory diagram showing a diagnosing system for diagnosing a copying machine according to another embodiment of the present invention. In the figure, reference numeral 120 designates a copying machine as one of terminal devices to be diagnosed; 121, a remote interactive communication function board (RICFB), installed in each copying machine 120, for predictively locating a trouble of the copying machine; 122, a host computer connected through telephone lines to a plurality of copying machines; 124 and 125, modems located in a path between the copying machine 120 and the host computer 122 and for modulating and demodulating data signals passing through the path; and 126, an expert system (ES), communicatively connected to the host computer 122, for diagnosing the functional parts of the copying machine 120, the failure of which is predicted, according to a request instruction issued from the host computer 122.

Figure 10:
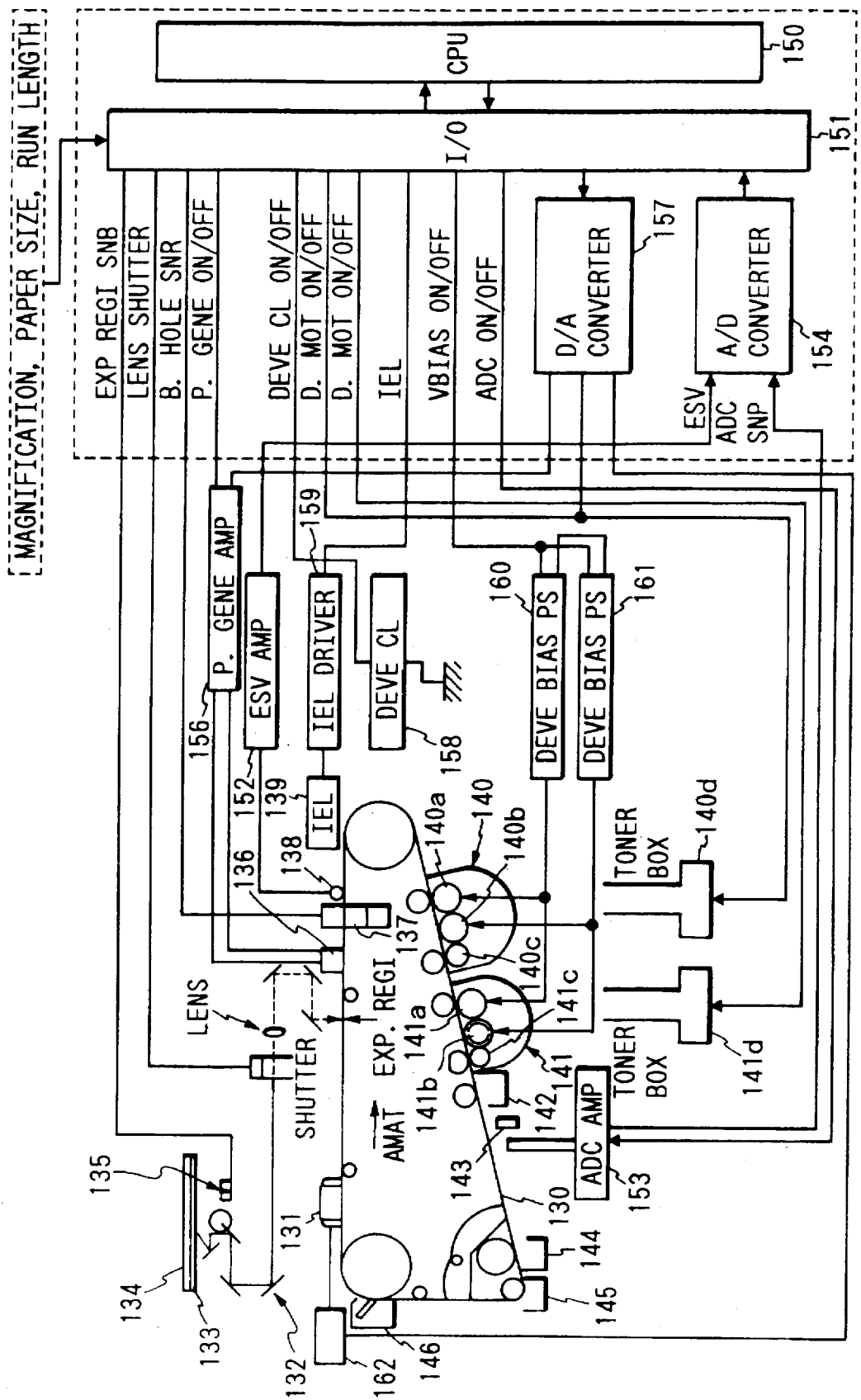
FIG. 10 is a diagram showing in block and schematic form the construction of an overall image forming unit of the copying machine according to the second embodiment.

FIG. 10 is an explanatory diagram showing an overall construction of an image forming unit of the copying machine in the present embodiment.

In the figure, reference numeral 130 designates a photoreceptor in the form of a belt; 131, a charge corotron for initially charging the photoreceptor belt 130; 132, a scan optical system for scanning an original document 134 located on a platen 133 in a slit-exposure mode; 135, an exposure registration sensor for sensing an exposure scan start position on the platen 133; 136, a patch generator forming a latent electrostatic image for copy-quality control on the photoreceptor belt 130; 137, a belt hole sensor for sensing a reference position indicative hole formed in the photoreceptor belt 130; 138, an electric static voltmeter (ESV) for sensing an initial charge potential on the photoreceptor belt 130; 139, an erase lamp for erasing an unnecessary latent image on the photoreceptor belt 130; 140, a first developing unit for main color based on the two-component developing system, which includes two stages of developing rolls 140a and 140b, and a catch-up roll pair 140c for collecting the carrier transferred to the photoreceptor belt 130; 141, a second developing unit for sub-color based on the two-component developing system, which includes two stages of developing rolls 141a and 141b, and a catch-up roll pair 141c for collecting the carrier transferred to the photoreceptor belt 130; 142, a pre-transfer corotron for removing potential on the photoreceptor belt 130 to set up an easy transfer condition for a toner image on the photoreceptor belt 130; 143, an automatic density control (ADC) for sensing an optical density of a toner image on the patch portion; 144, a transfer corotron for transferring a toner image on the photoreceptor belt 130 onto a copying sheet, not shown; 145, a detach corotron for detaching the image-transferred sheet from the photoreceptor belt 130; and 146, a cleaner for removing residual toner on the photoreceptor belt 130. The copying sheet after having undergone the transfer process passes through a fusing unit where the toner image on the sheet is fused and fixed thereon.

The image forming unit thus constructed is driven and controlled by a drive/control system shown in FIG. 10.

In the figure, a marking CPU 150 executes a marking program to form a toner image, which corresponds to an image on an original document 134, on the photoreceptor belt 130, and transfers the toner image on the copying sheet. The marking CPU 150 receives various types of input control signals through an input/output interface 151 and outputs various types of output control signals.

In the present embodiment, the input control signals include control signals for the magnification, sheet size, run length (RUN LENGTH), and the like instructed on a control panel of the copying machine 120, a position detecting signal (EXP REGI SNR), a lens shutter signal (LENS SHUTTER) in the scan optical system 135, a position detecting signal (B.HOLE SNR) derived from the belt hole sensor 137, a detecting signal formed by digitizing an output signal (ESV) from the ESV sensor 138 through an ESV amplifier 152 and an A/D converter 154, and a detecting signal formed by digitizing an output signal (ADC SNR) from the ADC sensor 143 through an ADC amplifier 153 and the A/D converter 154.

The output control signals include a patch generator on/off signal (P.GENE ON/OFF) supplied through a patch generator amplifier 156 to the patch generator 136, a patch generator voltage signal supplied through a D/A converter 157 and the patch generator amplifier 156 to the patch generator 136, a developing clutch on/off signal (DEVE CL ON/OFF) supplied to a developing clutch 158, toner supply signals, or dispenser motor on/off signals, applied to the toner box 140d of the first developing unit 140 and the toner box 141d of the second developing unit 141, an erase signal (IEL) applied through an erase driver 159 to the erase lamp 139, developing bias on/off signal (VBIAS ON/OFF) supplied through developing bias supply 160 and 161 to the developing rolls 140a and 140b, and 141a and 141b respectively of the first and second developing units 140 and 141, developing bias level setting signals supplied through the D/A converter 157 and the developing bias supply 160 and 161 to the developing rolls 140a and 140b, and 141a and 141b respectively of the first and second developing units 140 and 141, an ADC on/off signal (ADC ON/OFF) through the ADC amplifier 153 to the ADC sensor 143, and a voltage control signal applied to the charge corotron 131 through the D/A converter 157 and a high voltage supply 162.

Figure 11:
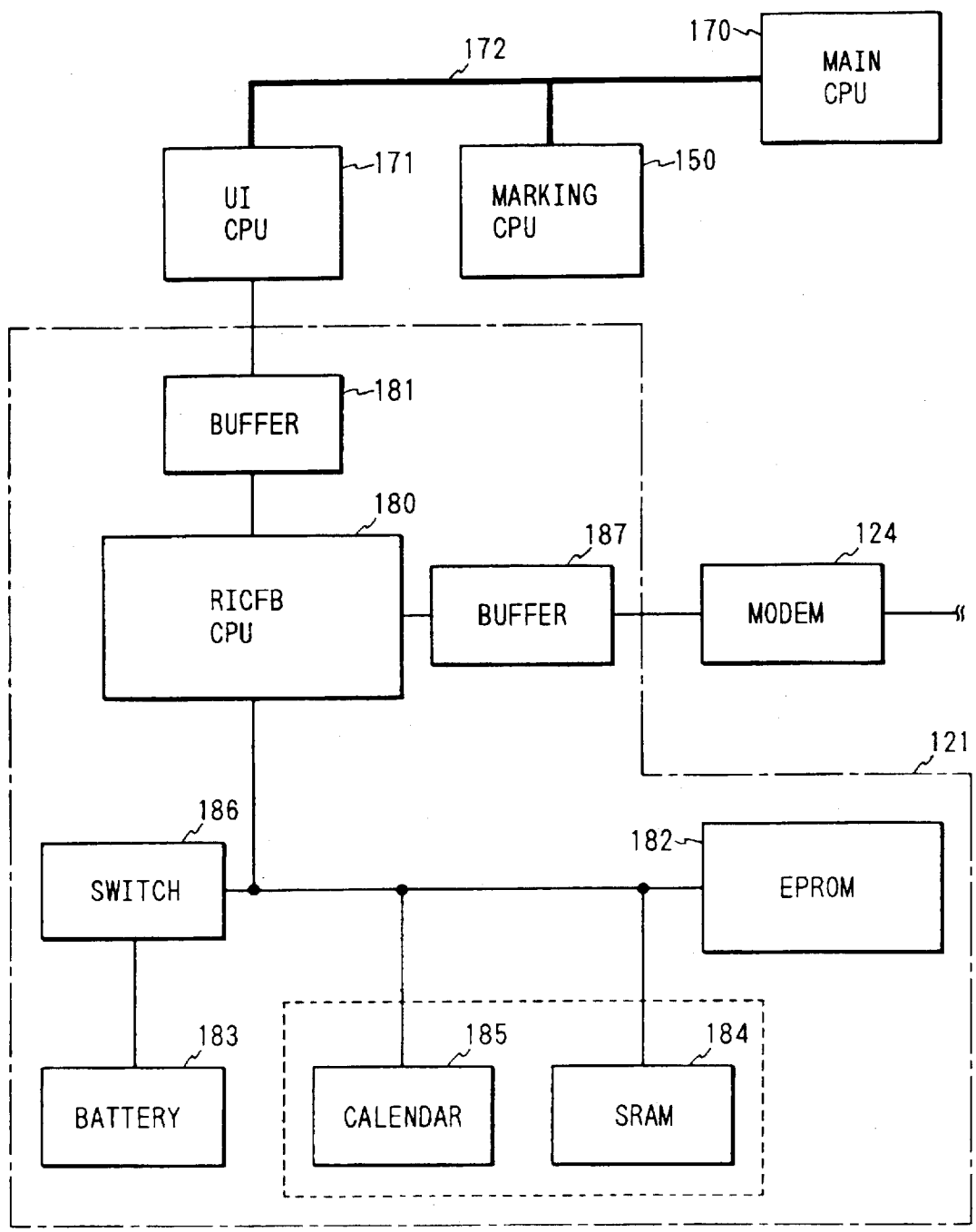
FIG. 11 is a block diagram showing an RICFB (remote interactive communication function board) in the diagnosing system.

FIG. 11 is a block diagram showing an overall arrangement of the RICFB 121.

In the figure, the RICFB 121 is communicatively connected to the copying machine 120, through a user interface (UI) CPU 171 of the machine. Further, it can receive the data stored in the marking CPU 150 and a main CPU 170, through a system bus 172 and the UI CPU 171.

In the instance of the embodiment, a diagnosis request button is provided on a console panel (not shown) or a display (not shown) of the copying machine 120. An operator or a customer engineer selectively operates the button to diagnosis the machine. When the button is operated, a diagnosis request signal is applied through the user interface UI CPU 171 to the RICFB 121. Upon receipt of the request signal, the RICFB 121 sends a diagnosis request signal to the host computer 122 and also sends the data necessary for diagnosis to the copying machine 120. Where only the customer engineer is permitted to operate the diagnosis request button, it is suggestible to locate the button at such a place as to reject the access to the button by the user.

In this instance, the RICFB 121 includes a RICFB CPU 180, which is coupled through a buffer 181 with the UI CPU 171. The RICFB CPU 180 includes an EPROM 182 into which an ACSS program (to be given later) and the memory data (e.g., major parameter data for copy quality control) stored in the marking CPU 150. The RICFB 121 further includes means 184 and 185 storing diagnosis data nd calendar. When a power down occurs, a switch 186 operates to form a power supply path from a back-up battery 183 to those storing means 184 and 185. A buffer 187 is interposed between the RICFB CPU 180 and the modem 124.

Figure 12:
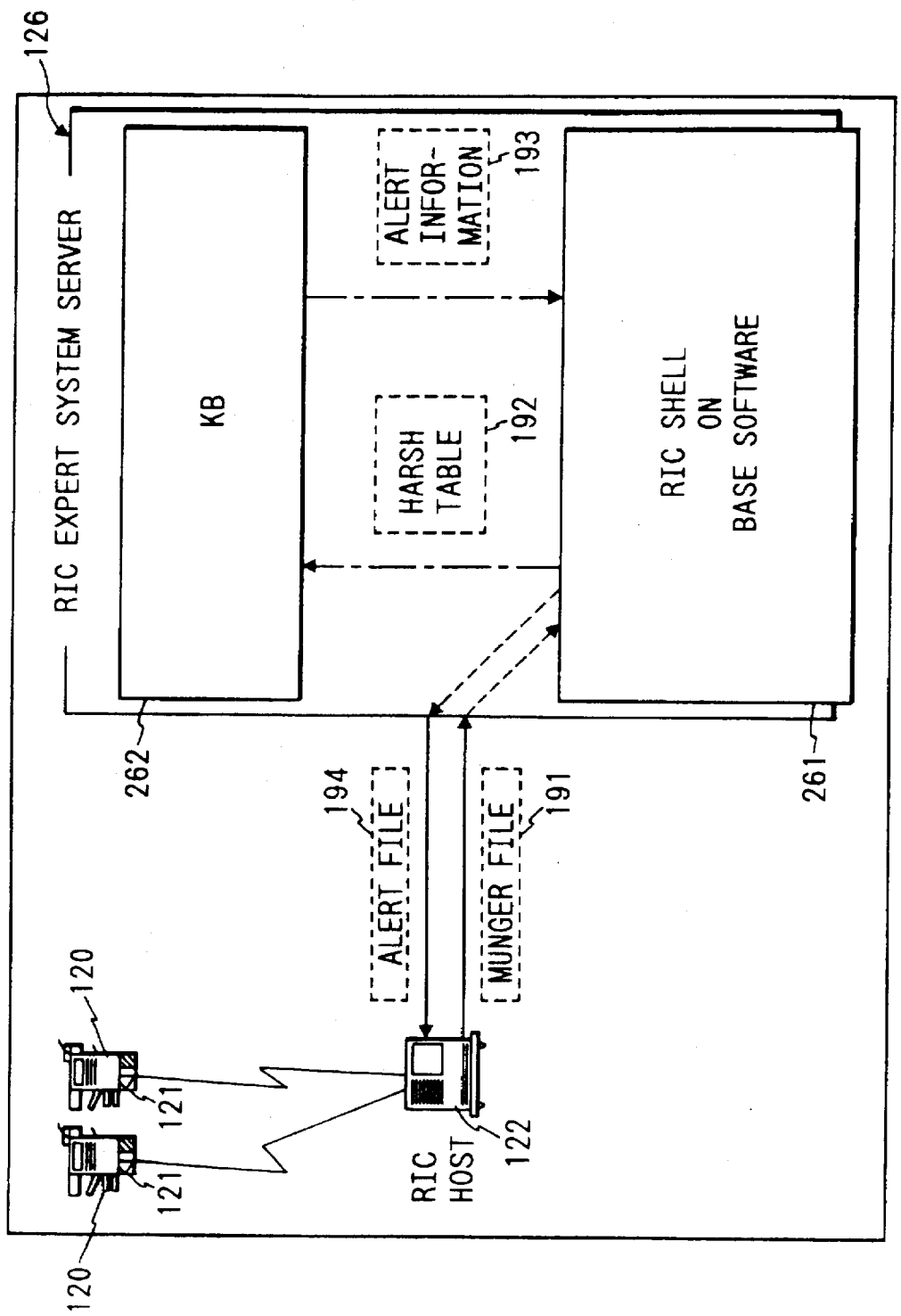
FIG. 12 is a diagram showing the basic construction of an ES (expert system) employed in the present embodiment.

FIG. 12 is a diagram showing the details of the expert system (ES) used in the present embodiment.

In the figure, an ES 126 is a so-called artificial intelligence (AI) diagnosis server for performing a diagnosis service in response to a diagnosis request by the host computer 122.

In the embodiment, the host computer 122 sends a diagnosis data file 191 (which is the data of the machine under diagnosis expressed in a specific format, and this file will be referred to as a Munger file) as an argument for the diagnosis request to a RIC shell 261 on the base software of the ES 126. Then, the RIC shell 261 loads the contents of the Munger file 191 into a harsh table 192.

A diagnosis knowledge base (abbreviated as KB) diagnoses the information within the Munger file 191 on the basis of the knowledge base, with an argument (input) as the Munger file 191 loaded into the harsh table 192 in response to a request from the RIC shell 261, and returns a corresponding Alert information 193 as an output to the RIC shell 261. Then, the RIC shell 261 generates an Alert file 194 from the Alert information 193, and responds to an instruction from the host computer 122 to return the Alert file 194 to the host computer 122.

When a symptom indicative of a trouble, based on the ACSS program of the RICFB 121, evidently appears in the machine under diagnosis, the KB 262 infers the cause of the trouble according to a value presented by the ACSS program. When symptoms of troubles do not appear before the diagnosis starts (the troubles on the copy quality and jam in the embodiment), the KB 262 predictively diagnoses the machine on all the probable troubles, not dependent on the ACSS value.

Figure 13:
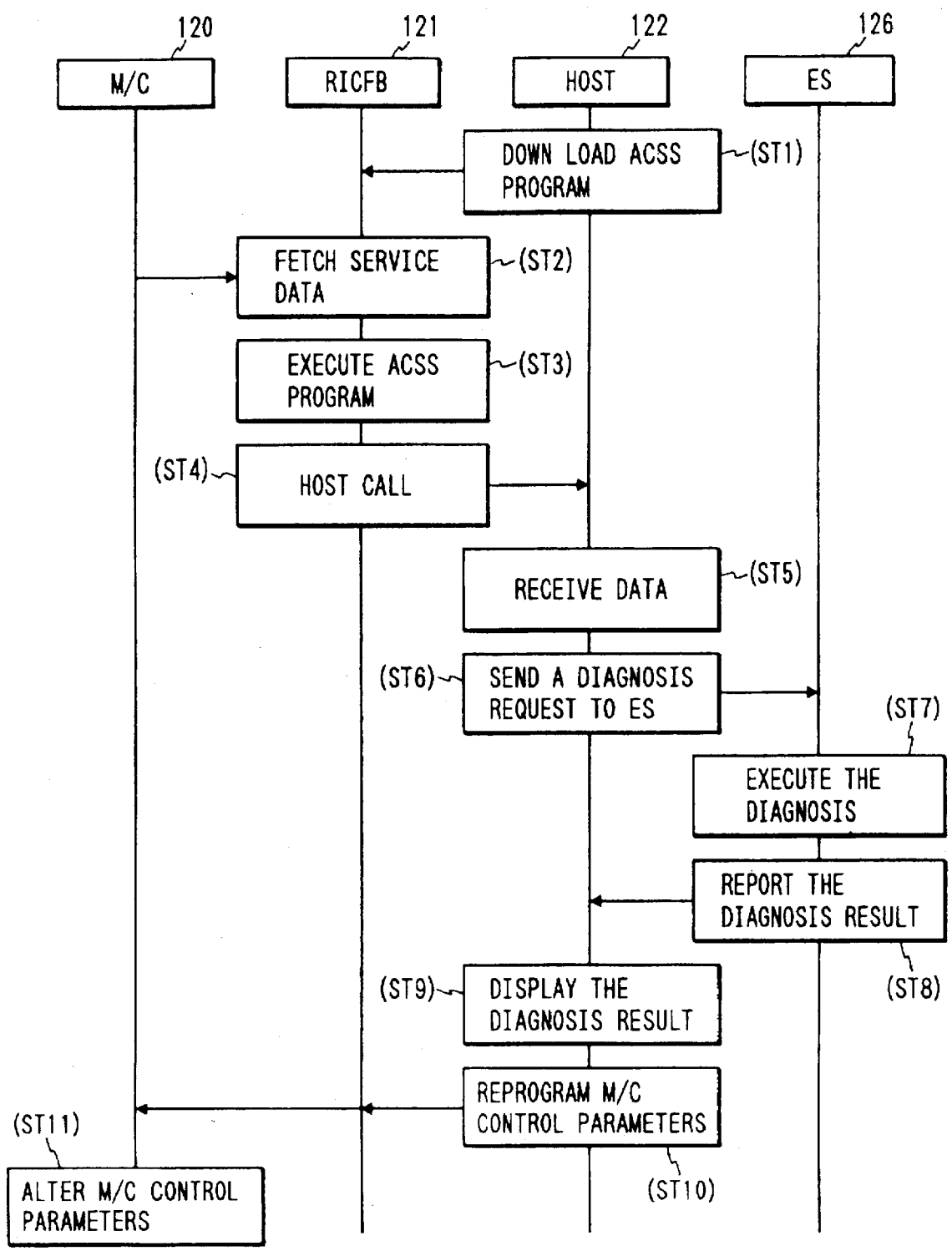
FIG. 13 is a diagram showing sequential steps of an overall processing of the diagnostic system.

FIG. 13 is a chart diagrammatically showing a sequence of an overall processing of the copying machine (M/C) 120 as a machine under diagnosis, RICFB 121, host computer (HOST) 122, and the ES 126.

The HOST 122 down loads an ACSS (alert criteria syntax specification) program (to be given later) into the RICFB 121 (step 1 or ST 1).

Thereafter, the RICFB 121 periodically fetches diagnosis data and the like necessary for the copy quality control from the copying machine 120 (ST 2), and performs the ACSS program (ST 3). When the RICFB 121 executes the ACSS program, and an alert is generated, it calls the HOST 122 (ST 4).

In turn, the HOST 122 receives the data from copying machine 120 in a predetermined order for reception (ST 5), and sends diagnosis requests to the ES 126 in the receiving order (ST 6).

Thereafter, the ES 126 after receiving the diagnosis requests performs the diagnoses (ST 7), and reports the diagnosis results to the HOST 122 (ST 8).

The HOST 122 displays the diagnosis results (ST 9), and if an automatic repair of the trouble is possible, requests the copying machine 120 to reprogram the control parameters of the M/C 120, through RICFB 121 (ST 10). In response to the request, in the M/C 120, control parameters are altered (ST 11).

Figure 14:
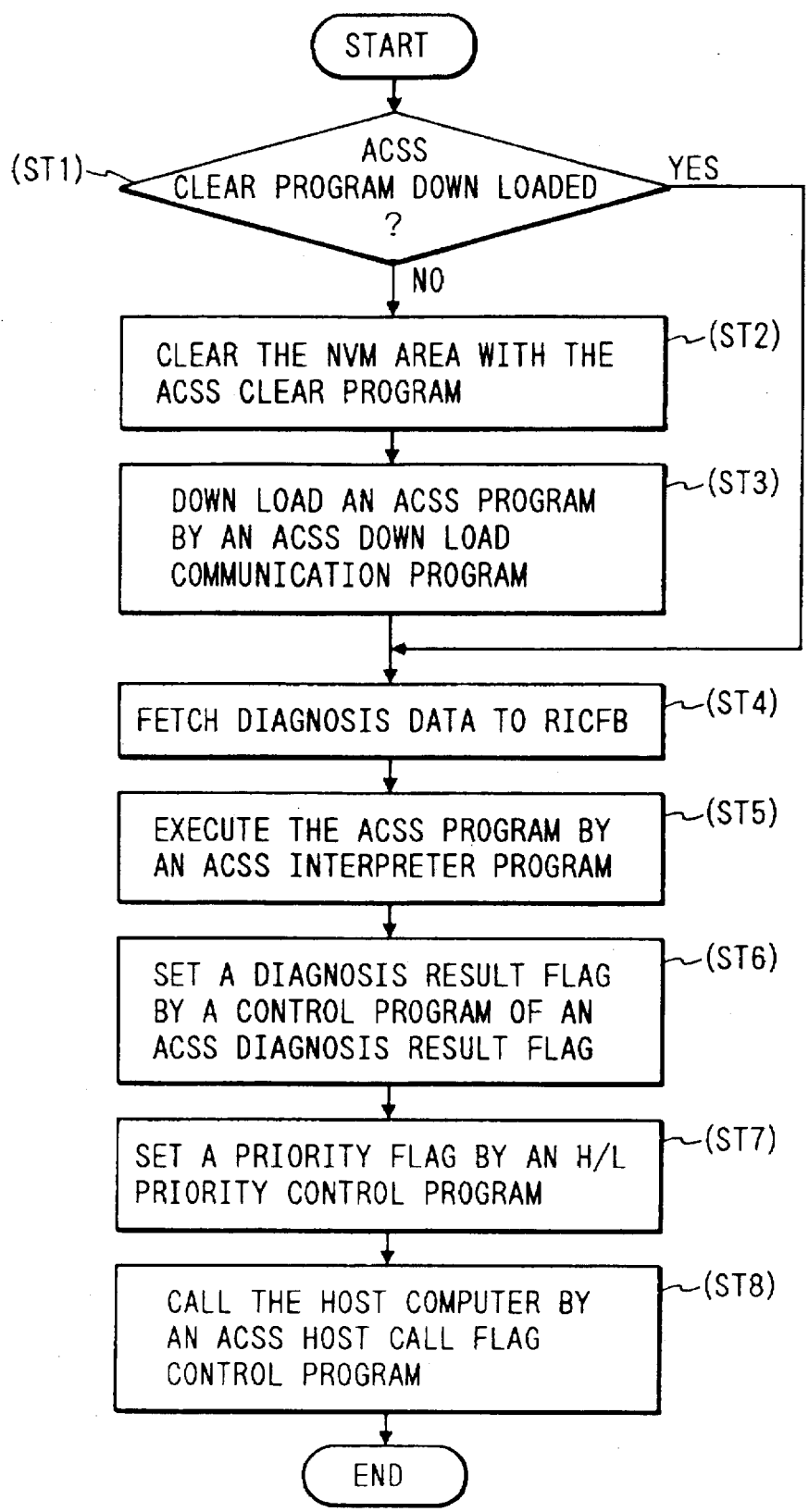
FIG. 14 is a flow chart showing sequential steps of an RICFB processing.

FIG. 14 is a flowchart showing the details of a RICFB processing sequence.

In the figure, the RICFB 121 checks whether or not the ACSS program has been down loaded (ST 1). If not yet down loaded or the program has been down loaded but it must be altered, it clears an NVM (non volatile memory) of an SRAM 184 by the ACSS program (ST 2), and down loads the ACSS program by an ACSS down-load communication program (ST 3).

In this state, the RICFB 121 fetches service data a to d as diagnosis data periodically (in this instance, at intervals of 15 minutes to 65,000 minutes) (ST 4), and conducts tests (e.g., test 1 to test 255) using the service data a to d by an ACSS interpreter program (ST 5).

Figure 17:
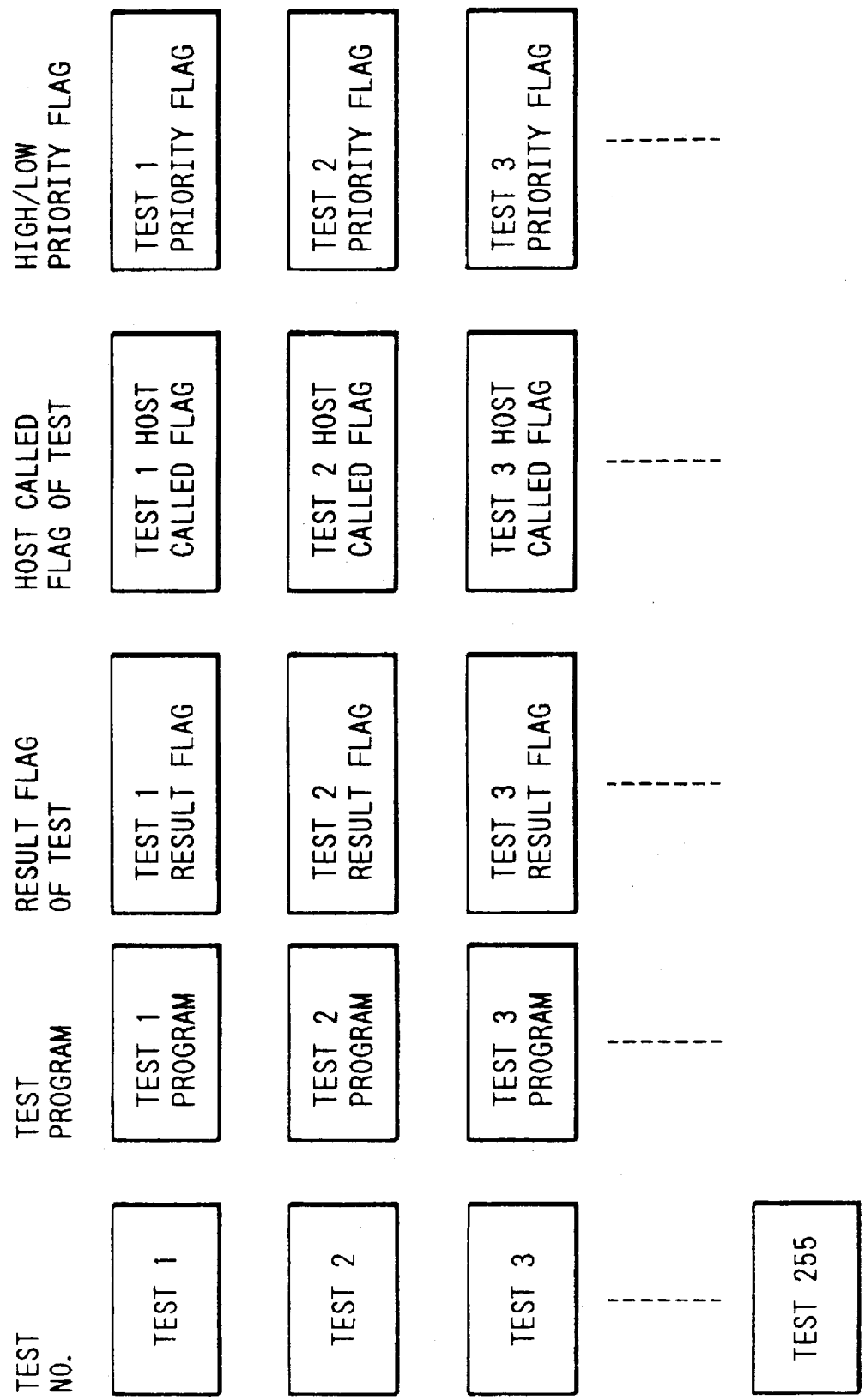
FIG. 17 is an explanatory diagram showing the flags in executing the ACSS program.

The RICFB 121, as shown in FIGS. 14 and 17, sets a diagnosis result flag (RESULT FLAG) indicating whether or not the diagnosis result by the test indicates an alert generation, by a control program for ACSS diagnosis result flags (ST 6). A priority flag (PRIORITY FLAG) indicative of a priority level of each is set using an H/L (HIGH/LOW) priority flag control program (ST 7). Then, an ACSS host call flag control program places a call to the HOST 122 (ST 8).

In the instant embodiment, as shown in FIG. 18, RICFB alert numbers are determined in advance for the respective tests. Six RIC levels (alert level previously defined) are respectively provided for the RICFB alert numbers according to a degree of emergency of the alert. The RIC levels are system fail, local fail, time bomb, prevent maintenance, information, and others. For the RIC levels of system fail, local fail, time bomb, and prevent maintenance, the priority flags are HIGH, and for the information and others, it is LOW.

Figure 15:
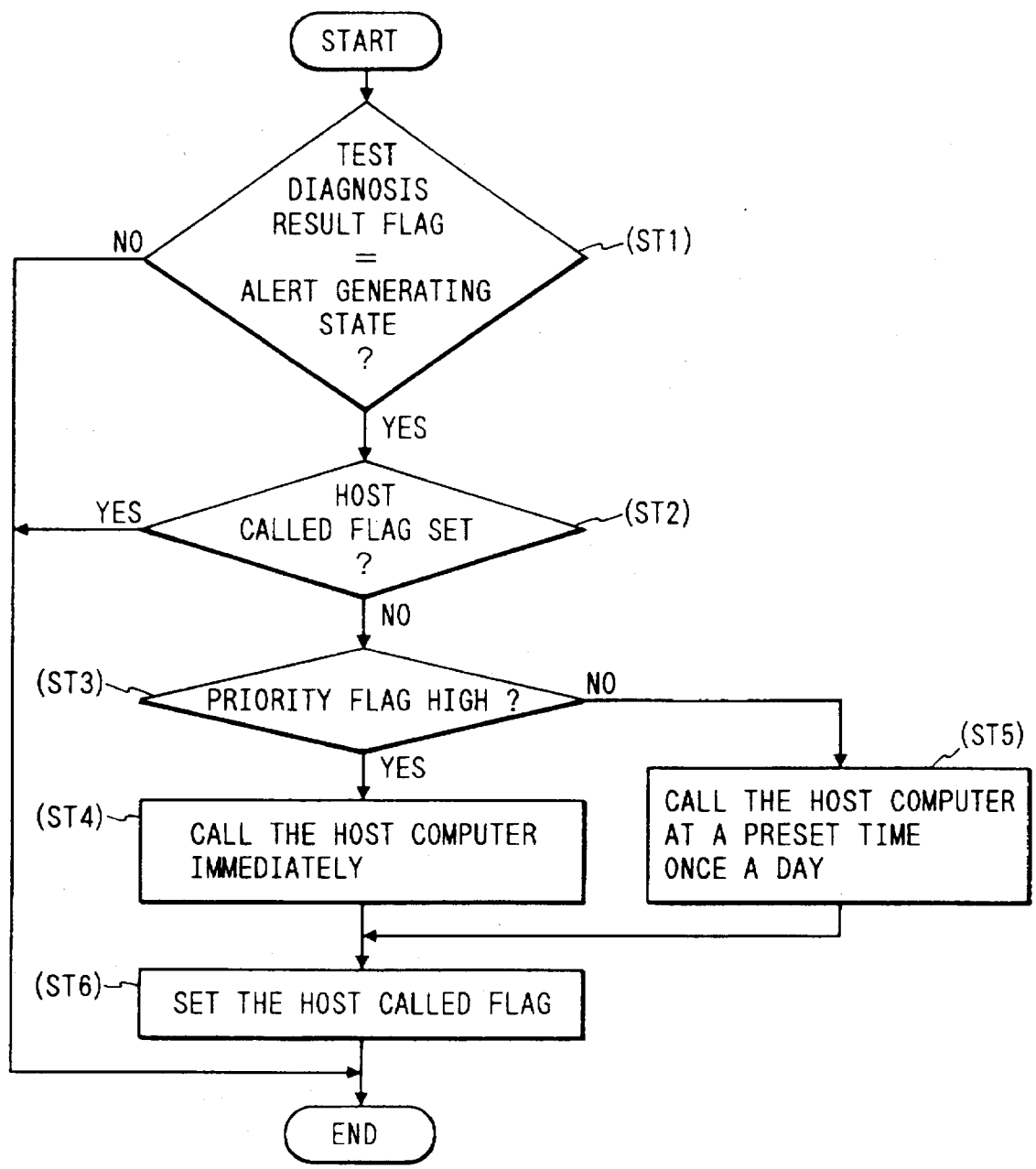
FIG. 15 is a flow chart showing a sequence of steps for executing a host called flag control program of the RICFB.
Figure 16:
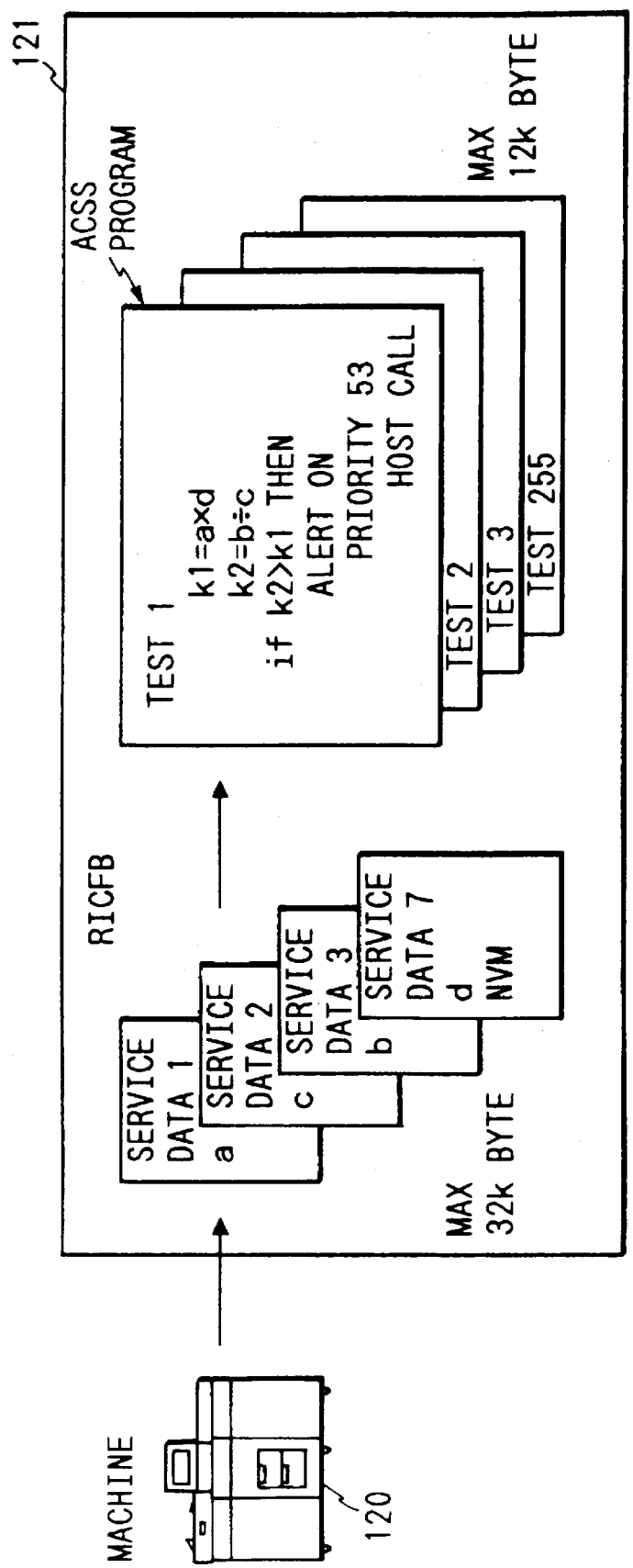
FIG. 16 is a diagram showing a state of executing an ACSS interpreter program of RICFB.

The step of ST 8 in the chart of FIG. 14 will be described in detail with reference to FIG. 15.

In the figure, the RICFB 121 checks whether or not the diagnosis result flag by the test indicates an alert generation status (ST 1). If it indicates an alert generation status, it checks whether or nota host called flag (HOST CALLED FLAG) has been set (ST 2). If the flag is not set, it checks whether or not the priority flag is HIGH (ST 3). If the flag is HIGH, it immediately calls the HOST 122 as shown in FIG. 18 (ST 4). If the priority flag is LOW, it calls the HOST 122 a preset time once a day (ST 5). At this time, a priority level shown in the HOST level in FIG. 18 is set in a LOGIN PACKET to be transferred to the HOST 122 when an ACSS alert is generated. When a call is placed to the HOST 122, a host called flag is set as shown in FIG. 17 (ST 6).

In the instant embodiment, all the alerts generated in the ACSS are not transferred to the HOST 122. To improve the diagnosis efficiency, only ten alerts of high alert levels are transferred being contained in the service data.

FIG. 19 is a flow chart showing a sequence of steps of the processing by the HOST 122.

As shown, to start, the HOST 122 checks the priority within a LOGIN PACKET from the RICFB 121 (ST 1). It determines the order for receiving HOST calls generated within a fixed time period (e.g., 3 minutes) according to the priority order (ST 2). Then, it dumps the data in the receiving order (ST 3).

Thereafter, the HOST 122 requests the ES (expert system) 126 to perform a diagnosis (ST 4), and then checks whether or not the diagnosis result has been received from the ES 126 (ST 5). When the diagnosis result is received from the ES 126, the diagnosis result is displayed on the display (ST 6).

The HOST 122 checks whether or not an automatic repair of the related functional parts of the machine is possible (ST 7). If it is possible, the HOST 122 requests the RICFB 121 to reprogram the control parameters for the related functional parts (ST 8). Then, the control parameters stored in the NVM (nonvolatile memory) of the machine are altered. If the automatic repair is impossible, it instructs a customer engineer to make repairs on the diagnosis results (ST 9).

Specific processings in ST 8 follow.

In a case that an optical density of a reproduced image at the IOT (image output terminal) is determined to be low, the step ST 8 alters a parameter for setting a developing bias or a charge parameter for the charge corotron, thereby to increase the optical density of the reproduced image.

Figure 20:
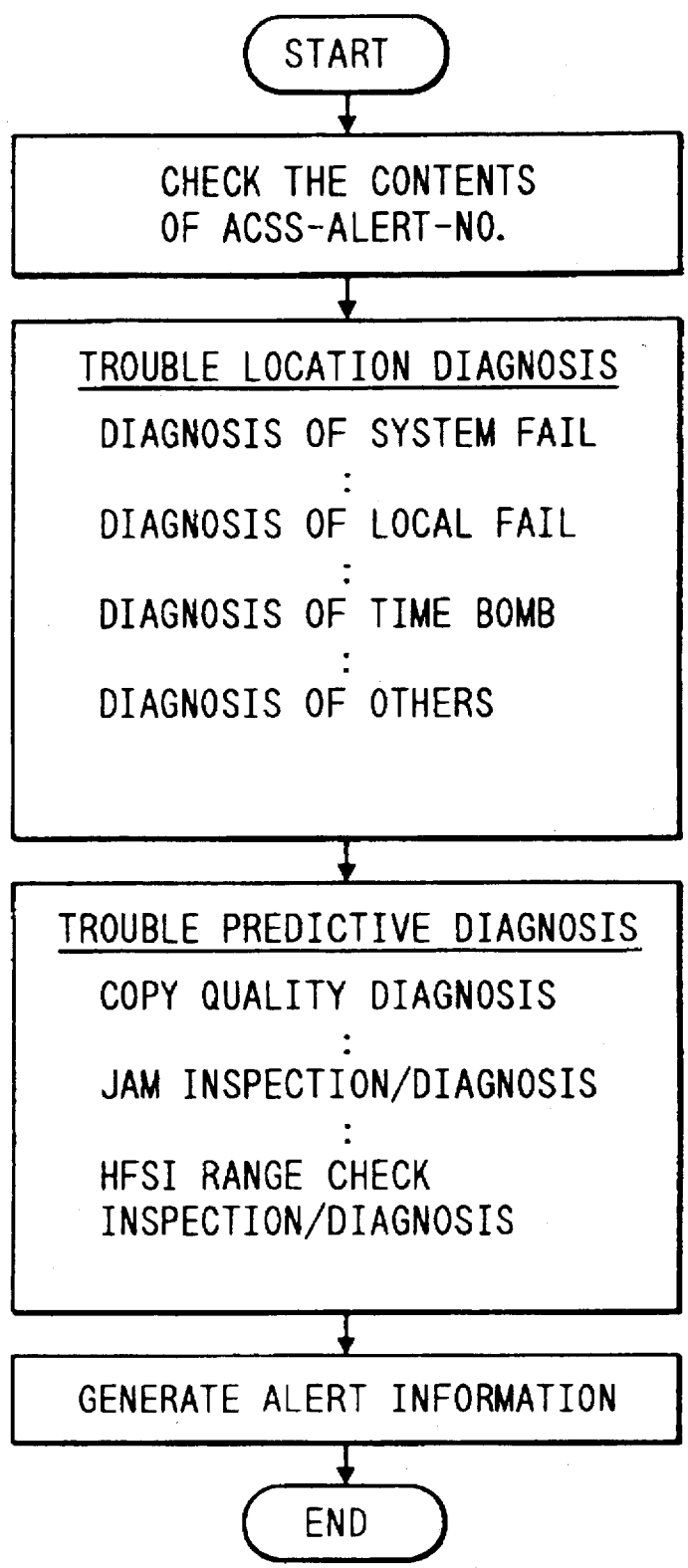
FIG. 20 is a flow chart how a KB (diagnosis body) executes its processing.

The ES 126, as stated above, includes the RIC shell 261 and the KB 262. The object to be communicated with the KB 262 is only the RIC shell 261. In other words, the KB 262 by itself cannot communicate with the HOST 122 and other devices. FIG. 20 is a flow chart showing a sequence of steps of processing by the KB 262

As shown, the KB 262 first refers to the harsh table 192 to check the contents of the alert number of the ACSS, and diagnoses trouble locations in the priority order of system fail, local fail, time bomb, prevent maintenance, information, and the rest. For the RIC levels of system fail, local fail, time bomb, and prevent maintenance.

When the diagnoses are completed, the KB 262 performs a trouble predictive test diagnosis on the level check of the copy quality, jam, and HFSI (high frequency service item).

An outline of the trouble location diagnosis will be given hereunder. The diagnosis is applied to only a definite symptom of trouble based on the ACSS. The values tend to link with the diagnosis results. The diagnosis has diagnosed some of trouble locations before the ACSS sends data to the HOST 122. In some cases, a plurality of rules are required to be booted in the level of the KB 262. These cases may be considered to indicate such a state that in the ACSS level, the trouble cause is located to a certain degree, but not perfectly, and hence some candidates are present for the cause. To these cases, a principle-forward reasoning is applied, thereby to narrow the candidates down to one true cause of trouble. If the value of the ACSS is deemed to indicate the diagnosis result, the diagnosis is the process to locate the cause. Hence, it may be considered as a cause attribute reasoning.

Thus, the KB 262 generates necessary ALERT information based on the knowledge obtained from a DE (domain experts), which the information perfectly correspond to the defined alert numbers. The major specifications of the rules are provided for locating trouble locations, hand-shaking to comply with the specifications of the RIC shell 261, and extracting corresponding repair actions.

An outline of the trouble predictive test diagnosis will be given. As for the range check of HFSIs, this diagnosis generates a prescribed alert for those in excess of a prescribed threshold, and essentially it is substantially the same as the trouble diagnosis of the rule specifications.

As regards the troubles of copy quality and jam, the hypothetical trouble is extracted and the hypothetical reasoning is performed perfectly independently of the ACSS. The trouble predictive test diagnosis is greatly different from other diagnosis processings in that the principal object of the processing of the diagnosis is not to extract the repair action of the determinate trouble, but to extract troubles to possibly occur or having occurred. Afterwards, for those hypothetical troubles, the repair action and determinate values of the troubles as well are extracted. The hypothetical reasoning is a backward reasoning, while the trouble diagnosis is the forward reasoning.

Figure 4:
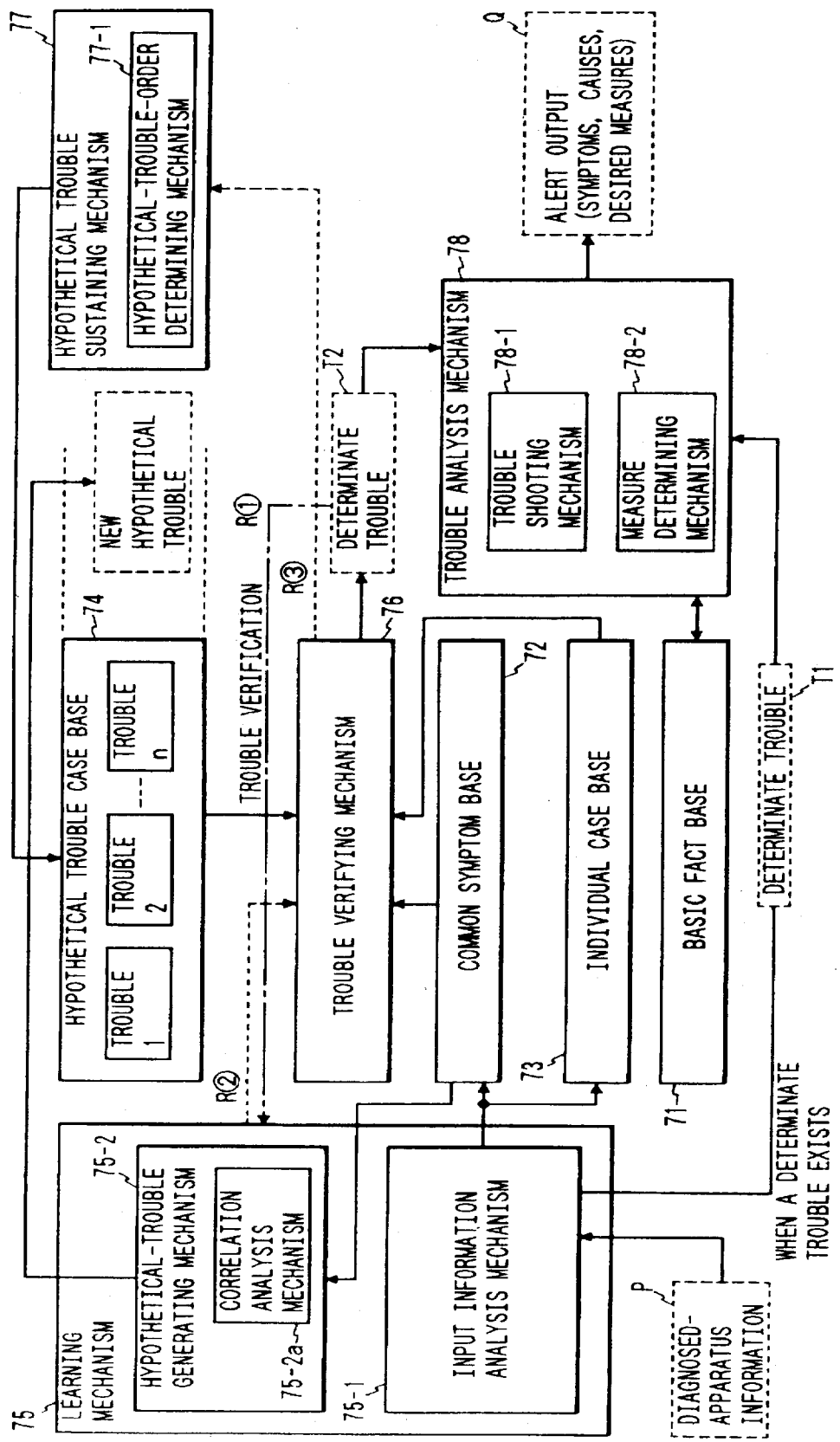
FIG. 4 is a block diagram showing the arrangement of a knowledge base system for diagnosing the copying machine.

A functional block diagram showing the details of the KB 262 used in the present embodiment is the same as that shown in FIG. 4, and will not be described.

Next, the contents of the hypothetical-trouble case base 74 and the verifying logic will be described in detail. The hypothetical-trouble case base 74 is designed all on the basis of the object oriented programming language (see FIG. 4). A part of the hypothetical-trouble case base is shown in FIG. 21 where the copy quality trouble is emphatically illustrated.

Figure 21:
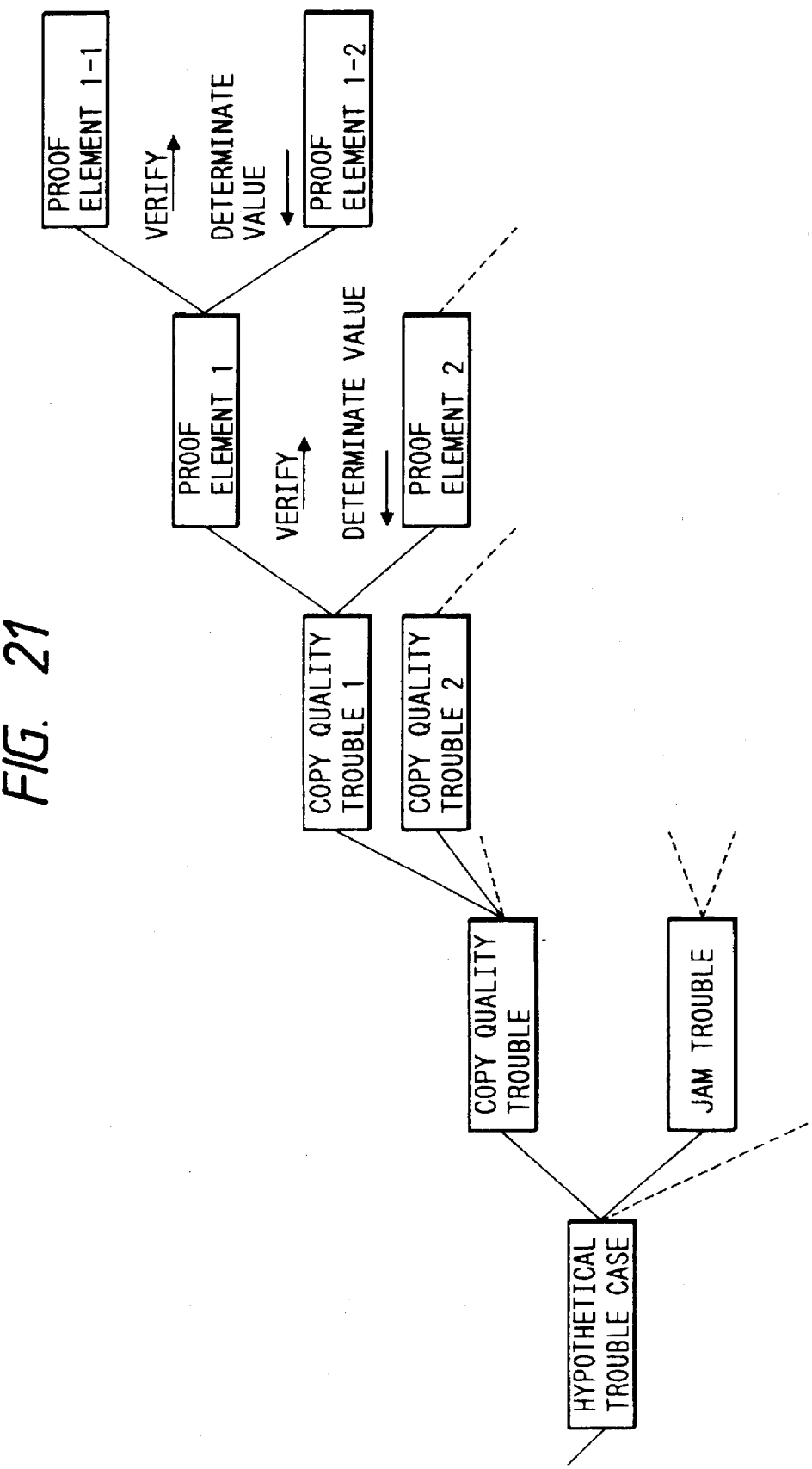
FIG. 21 is an explanatory diagram showing the contents of hypothetical trouble case base and a verifying logic.

The illustration of FIG. 21 teaches that the hypothetical trouble case contains copy quality trouble and jam trouble. Further, the copy quality trouble consists of plural types of troubles.

The illustration further shows that a copy quality 1 holds on the basis of two logical conclusion elements, and that the hypothesis of the element leads to two conclusion elements.

Each object retains necessary data in its slot, and necessary rules in its method slot. The lower ranking device can inherit all of those elements from the higher ranking device. The control of the method, for example, booting the method, is performed by the trouble verifying mechanism 76.

The logic of the verification resembles the so-called hypothetical reasoning.

Let us consider the verification of the copy quality trouble 1. The "proof element 1" and "proof element 2" are tested as to whether or not these elements hold. To this end, a message "verify" to prove is sent to the two objects. When receiving the message, the objects boot the methods corresponding to the message, to determine whether or not the proof elements hold. At this stage, the "proof element 1" and "proof element 2" do not yet determine whether or not the elements hold, and send the same message to the lower ranking objects which should prove the objects themselves, e.g., "proof element 1-1" and "proof element 1-2".

In this way, the objects of the lowest rank are reached, the objects return the results to the higher ranking objects. When receiving the results, the higher ranking objects sums the results received from the lower ranking objects, to decide the right and wrong of the objects themselves and returns the decision results to the higher ranking objects. In this way, the "jam trouble 1" is verified.

In making the proof, each object returns to the higher ranking object the right/wrong in terms of a determinate value between 0 to 100, not a binary or two-level value. The higher ranking decides the determinate value of the object itself in consideration of the plural results and the determinate values associated with the results. Finally, the "jam trouble 1" is attendant with the determinate value between 0 and 100, and the verification result of the trouble of the machine under diagnosis is inferred.

As the determinate value of the verification result approximates to 100, the probability of trouble occurrence becomes higher. As it approximates to 0, the probability become lower.

An inspection diagnosis of copy quality will be described by way of example.

The knowledge from a DE (domain experts) teaches that three indispensable elements for trouble determination of copy quality exist: surface potential trouble of the photoreceptor (P/R (photoreceptor) belt in the embodiment) surface, potential trouble of ADC patch generator, and trouble of copy density value.

Supposing that the above three elements are variables $X1$, $X2$ and $X3$, the trouble rate (determinate value) $Y$ necessary for the copy-quality trouble determination is described by the following function. In the function, $n1$, $n2$ and $n3$ are multipliers when the trouble rate $Y$ is determined with the three elements. $C$ is a coefficient to adjust the trouble rate $Y$ subtly when $Y$ is finally determined.

$$Y = (X1 \times n1 + X2 \times n2 + X3 \times n3) + C$$

where $0 \leq Y \leq 100$, $0 \leq n1 \leq 1$, $0 \leq n2 \leq 1$, $0 \leq n3 \leq 1$, $n1+n2+n3=1$
$0 \leq C \leq 100$, $0 \leq X1 \leq 100$, $0 \leq X2 \leq 100$, $0 \leq X3 \leq 100$.

Details of each element are defined as follows.

X1: Surface Potential Trouble of the Photoreceptor

This is calculated by using a pair of Munger data: the surface potential (A1) of the photoreceptor and the grid monitor value (A2) of the photoreceptor. As a result, two things become clear. One is whether the surface potential of the photoreceptor is normal or abnormal. Another is that if it is abnormal, the type of the machine failure that might happen.

Figure 22:
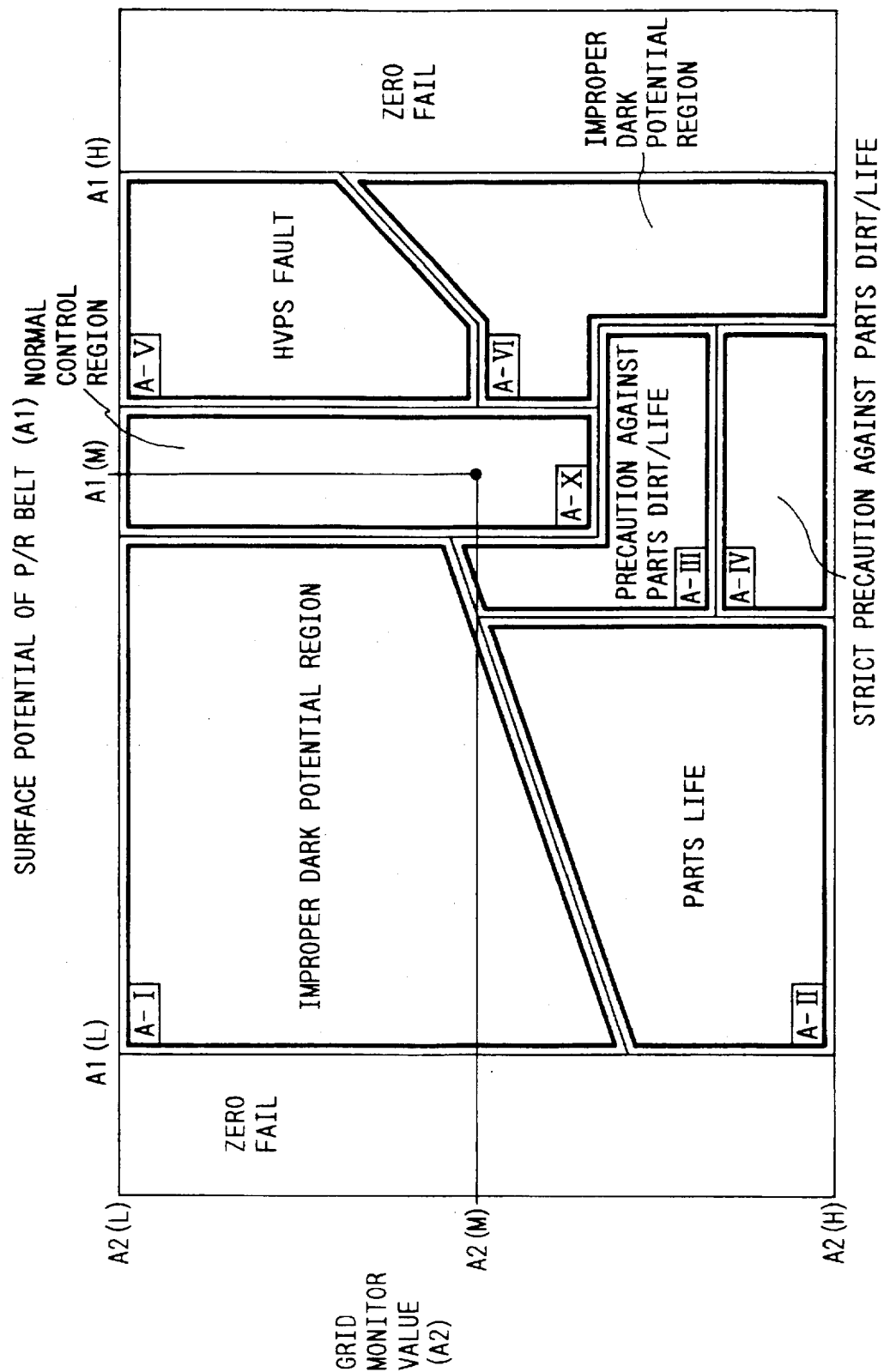
FIG. 22 is an explanatory diagram showing a trouble check table on the surface potential trouble of a P/R (photoreceptor) belt.

A trouble determination table for the trouble X1 is illustrated in FIG. 22. In the figure, the abscissa represents the surface potential (A1) of the P/R belt, and the ordinate represents the grid monitor value (A2) of the charge corotron (CC) which controls the surface potential of the P/R belt. The trouble determination table is defined by $A1(L) \leq A1 \leq A1(H)$ and $A2(L) \leq A2 \leq A2(H)$, where $A1(L)$ and $A2(L)$ represent each the lower limit of the range within which the xerography is operable, and $A1(H)$ $A2(H)$ represent each the upper limit of the range within which the xerography is operable. The thus defined area of the table is segmented into trouble probable regions A-I to A-X. A-I indicates the region where a dark potential formed through the initial charging process by the charge corotron, will probably be improper. A-II, the region where parts such as photoreceptor, charge corotron grid, and charge corotron pin will probably be defective. A-V, the region where the high voltage power supply (HVPS) will probably be defective. A-X, the normal control region. In the figure, A1(M) and A2(M) indicate the values of A1 and A2 corresponding to the optimum point in the normal control region. In a region (XERO FAIL) outside the region between A1(L) and A1(H), the xerography is inoperable.

The surface potential trouble X1 of the P/R belt is given by the following function, with arguments A1 and A2. The trouble X1 depends on a distance of a point defined by A1 and A2 from the optimum point, or A1(M) and A2(M), in the normal control region. As the distance becomes longer, the value of the trouble X1 becomes larger. In this instance of the embodiment, coefficients a1 to a4 indicate the interdependency of the P/R belt surface potential value and b1 to b4 indicate the interdependency of the P/R belt grid monitor value when the trouble rate is calculated.

---

Range of A1: $A1(L) \leq A1 \leq A1(H)$
Range of A2: $A2(L) \leq A2 \leq A2(H)$
$A1(L) \leq A1 \leq A1(M), A2(L) \leq A2 \leq A2(M)$:
$X1 = [\{(A1(M)-A1)\times(A1(M)-A1(L))\times a1\}+ \{(A2(M)-A2)\times(A2(M)-A2(L))\times b1\}]/100$
$A1(L) \leq A1 \leq A1(M), A2(M+1) \leq A2 \leq A2(H)$:
$X1 = [\{(A1(M)-A1)\times(A1(M)-A1(L))\times a2\}+ \{(A2-A2(M+1))\times(A2(H)-A2(M+1))\times b2\}]/100$
$A1(M+1) \leq A1 \leq A1(H), A2(L) \leq A2 \leq A2(M)$:
$X1 = [\{(A1-A1(M+1))\times(A1(H)-A1(M+1))\times a3\}+ \{(A2(M)-A2)\times(A2(M)-A2(L))\times b3\}]/100$
$A1(M+1) \leq A1 \leq A1(H), A2(M+1) \leq A2 \leq A2(H)$:
$X1 = [\{(A1-A1(M+1))\times(A1(H)-A1(M+1))\times a4\}+ \{(A2-A2(M+1))\times(A2(H)-A2(M+1))\times b4\}]/100$

---

X2: Potential Trouble of ADC Patch Generator

This is calculated by using a pair of Munger data: the potential (B1) of ADC patch generator and the control value (B2) of the machine flash to generate the most suitable patch generator potential. As a result, two things become clear. One is whether the potential of the ADC patch generator is normal or abnormal. Another is that if it is abnormal, the type of the machine failure that might happen.

Figure 23:
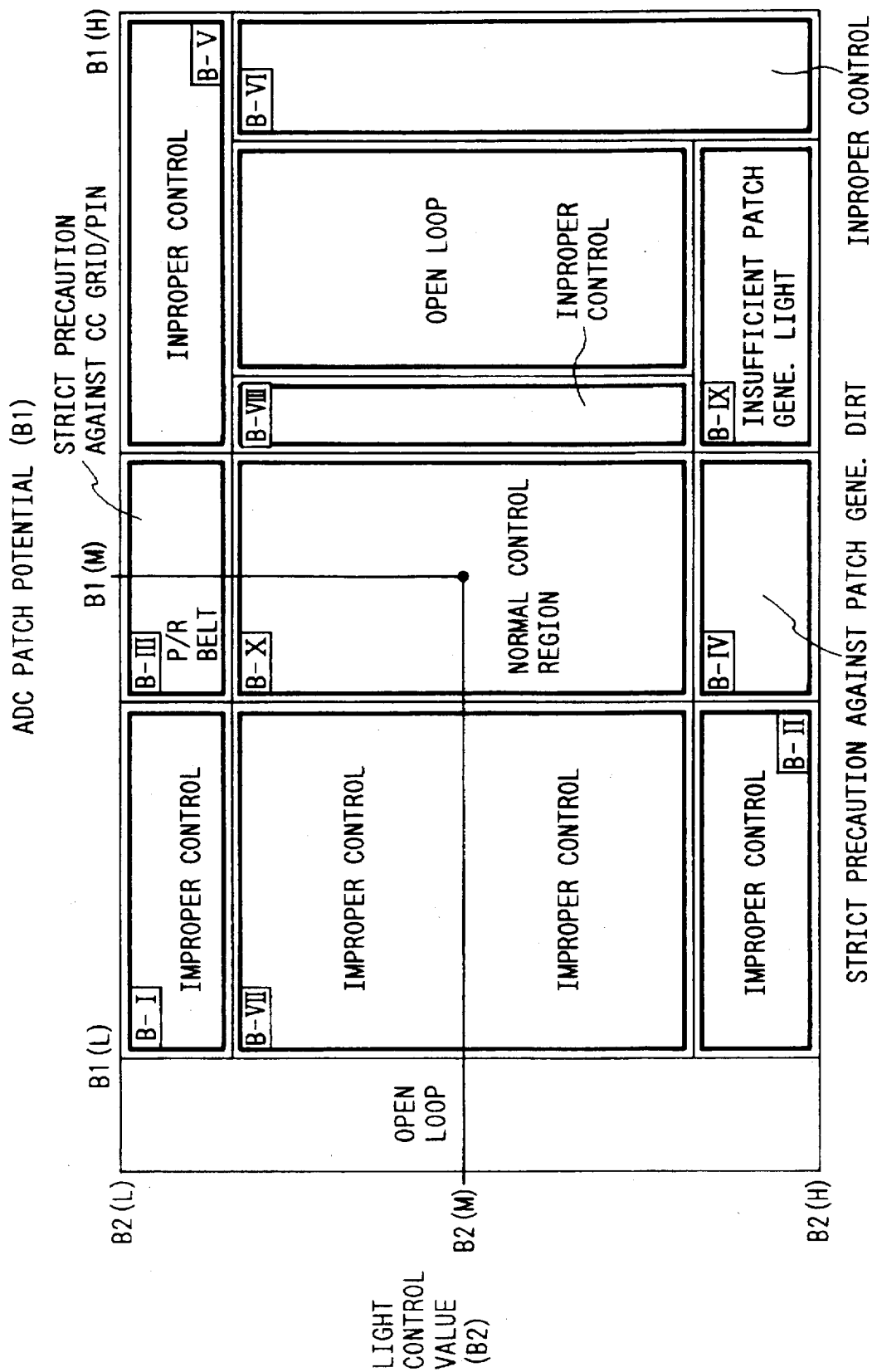
FIG. 23 is an explanatory diagram showing a trouble check table on potential trouble of the ADC patch generator.

A trouble determination table for the trouble X2 is illustrated in FIG. 23. In the figure, the abscissa represents the surface potential (B1) to form an ADC patch on the P/R belt, and the ordinate represents the control value (B2) of the machine flash to generate the most suitable patch generator potential. The trouble determination table is defined by $B1(L) \leq B1 \leq B1(H)$ and $B2(L) \leq B2 \leq B2(H)$, where $B1(L)$ and $B2(L)$ represent each the lower limit of the range within which the xerography is operable, and $B1(H)$ $B2(H)$ represent each the upper limit of the range within which the xerography is operable. The thus defined area of the table is segmented into trouble probable regions B-I to B-X. B-I, B-II, B-V, B-VI, B-VII and B-VIII indicate improper control regions of different levels. B-III indicates the region where parts such as photoreceptor, charge corotron grid, and charge corotron pin will probably be defective. B-IV indicates the region where the patch generator may be dirty. B-IX is the region where a quantity of light of the patch generator will probably be insufficient. B-X is the normal control region. B1(M) and B2(M) indicate the values of B1 and B2 corresponding to the optimum point in the normal control region.

The potential trouble X2 of the patch generator is given by the following function, with arguments B1 and B2. The meaning of the trouble X2 is similar to that of the trouble X1. Coefficients a1 to a4 indicate the interdependency of the ADC patch potential value, and b1 to b4 indicate the interdependency of the control value of the machine flash.

---

Range of B1: $B1(L) \leq B1 \leq B1(H)$
Range of B2: $B2(L) \leq B2 \leq B2(H)$
$B1(L) \leq B1 \leq B1(M), B2(L) \leq B2 \leq B2(M)$:
$X1 = [\{(B1(M)-B1)\times(B1(M)-B1(L))\times a1\}+ \{(B2(M)-B2)\times(B2(M)-B2(L))\times b1\}]/100$
$B1(L) \leq B1 \leq B1(M), B2(M+1) \leq B2 \leq B2(H)$:
$X1 = [\{(B1(M)-B1)\times(B1(M)-B1(L))\times a2\}+ \{(B2-B2(M+1))\times(B2(H)-B2(M+1))\times b2\}]/100$
$B1(M+1) \leq B1 \leq B1(H), B2(L) \leq B2 \leq B2(M)$:
$X1 = [\{(B1-B1(M+1))\times(B1(H)-B1(M+1))\times a3\}+ \{(B2(M)-B2)\times(B2(M)-B2(L))\times b3\}]/100$
$B1(M+1) \leq B1 \leq B1(H), B2(M+1) \leq B2 \leq B2(H)$:
$X1 = [\{(B1-B1(M+1))\times(B1(H)-B1(M+1))\times a4\}+ \{(B2-B2(M+1))\times(B2(H)-B2(M+1))\times b4\}]/100$

---

X3: Trouble of Copy Density Value

This is calculated by using a pair of Munger data: the surveillance value of patch reflection (C1) and the reflection value of P/R belt (C2). As a result, two things become clear. One is whether the copy density is normal or abnormal. Another is that if it is abnormal, the type of the machine failure that might happen.

Figure 24:
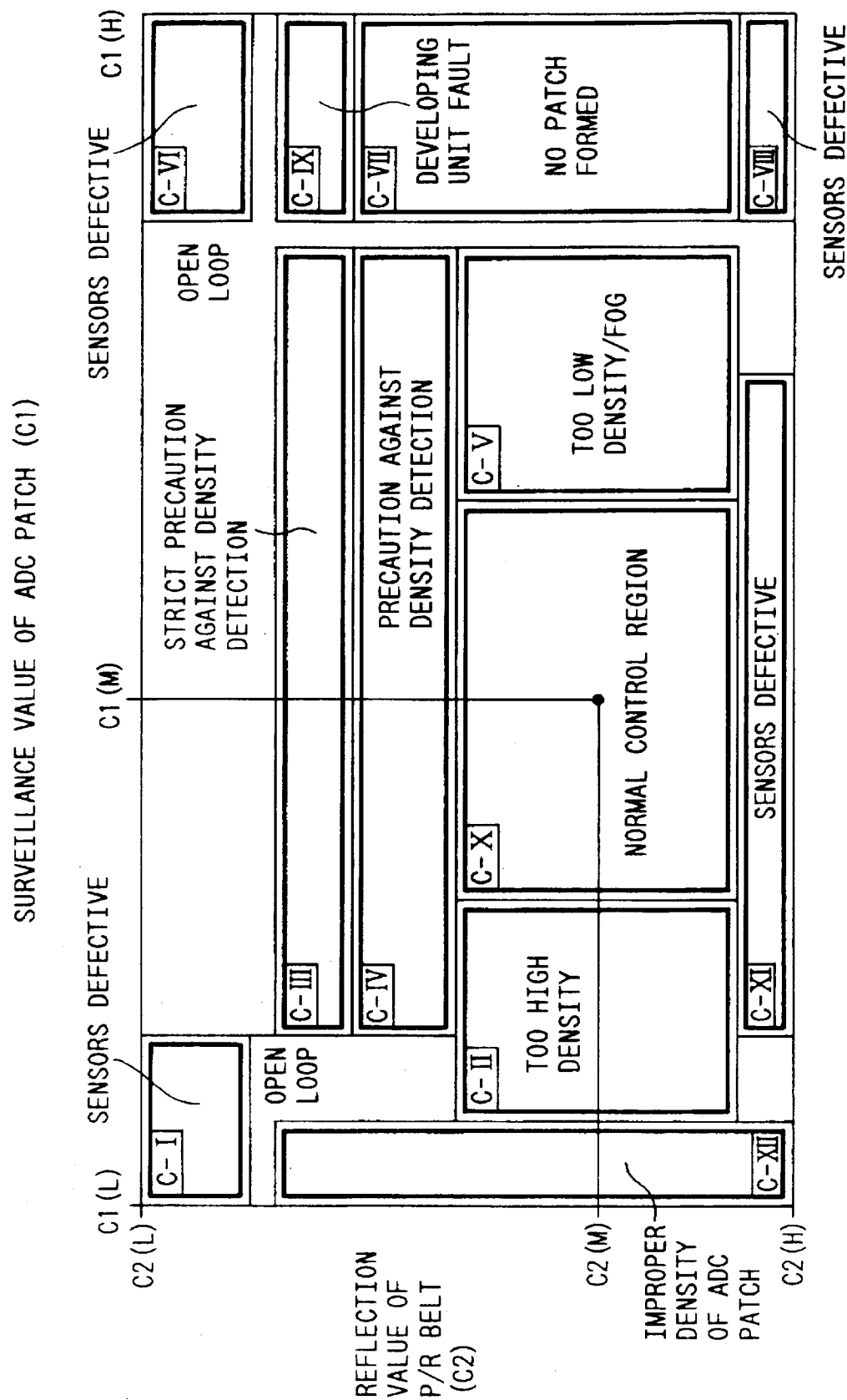
FIG. 24 is an explanatory diagram showing a trouble check table on trouble of the copy density value.

A trouble determination table for the trouble X3 is illustrated in FIG. 24. In the figure, the abscissa represents the surveillance value of patch reflection (C1), and the ordinate represents the reflection value of P/R belt (C2). The trouble determination table is defined by $C1(L) \leq C1 \leq C1(H)$ and $C2(L) \leq C2 \leq C2(H)$, where $C1(L)$ and $C2(L)$ represent each the lower limit of the range within which the xerography is operable, and $C1(H)$ $C2(H)$ represent each the upper limit of the range within which the xerography is operable. The thus defined area of the table is segmented into trouble probable regions C-I to C-XII. C-I, C-VI, C-VIII and C-XI indicate the region where various types of sensors will probably be defective. C-II is the region where the copy density may be excessively high. C-III is the region where precaution is needed against density detection. C-IV is the region where strict precaution is needed against density detection. C-V is the region where the copy density may be too low or may occur. C-VII is the region where the ADC patch may fail to be formed. C-IX is the region where the developing unit may be faulty. C-X is the normal control region. C-XII is the region where the density of the ADC patch may be improper. C1(M) and C2(M) indicate the values of C1 and C2 corresponding to the optimum point in the normal control region.

The potential trouble X3 of the copy density value is given by the following function, with arguments C1 and C2. The meaning of the trouble X3 is similar to that of the trouble X1. Coefficients a1 to a4 indicate the interdependency of the patch reflection, and b1 to b4 indicate the interdependency of the reflection value of the P/R belt.

---

Range of C1: $C1(L) \leq C1 \leq C1(H)$
Range of C2: $C2(L) \leq C2 \leq C2(H)$
$C1(L) \leq C1 \leq C1(M), C2(L) \leq C2 \leq C2(M)$:
$X1 = [\{(C1(M)-C1)\times(C1(M)-C1(L))\times a1\}+ \{(C2(M)-C2)\times(C2(M)-C2(L))\times b1\}]/100$
$C1(L) \leq C1 \leq C1(M), C2(M+1) \leq C2 \leq C2(H)$:
$X1 = [\{(C1(M)-C1)\times(C1(M)-C1(L))\times a2\}+ \{(C2-C2(M+1))\times(C2(H)-C2(M+1))\times b2\}]/100$
$C1(M+1) \leq C1 \leq C1(H), C2(L) \leq C2 \leq C2(M)$:
$X1 = [\{(C1-C1(M+1))\times(C1(H)-C1(M+1))\times a3\}+ \{(C2(M)-C2)\times(C2(M)-C2(L))\times b3\}]/100$
$C1(M+1) \leq C1 \leq C1(H), C2(M+1) \leq C2 \leq C2(H)$:
$X1 = [\{(C1-C1(M+1))\times(C1(H)-C1(M+1))\times a4\}+ \{(C2-C2(M+1))\times(C2(H)-C2(M+1))\times b4\}]/100$

---

In the trouble rate calculation for the copy quality trouble determination, where n1=0.5, if the potential of the ADC patch generator and the copy density value are not so abnormal, when the surface potential of the P/R belt is 100% abnormal, the trouble rate will be more than 50% at least. The coefficients of the three elements, a1 to a4 and b1 to b4, can subtly adjust the KB without the necessity of modifying each formula after the KB has been installed.

Thus, in the copy quality determination, as shown in FIGS. 25 and 26, determination criteria are based on the regions to which the parameters belong. Those satisfying the determination criterion are considered as the result of trouble determination and treated as hypothetical troubles. Further, the hypothetical trouble and the trouble rate (determinate value) as well are subjected to the trouble determination process.

Supposing that parameters satisfy the determination criterion 16 (FIG. 25), a hypothetical trouble of "too high density/fog level 4" is applied to those parameters. The system searches a "cause T16" of the hypothetical trouble. In the present embodiment, a target value of the surface potential of the P/R belt may be referred to in addition to the parameters for the determination criteria.

As described above, a copy-quality diagnosis pattern table is provided in which the major parameters for the copy quality control are arranged into patterns in accordance with copy quality levels. To determine a copy quality level, the pattern to which the major parameters for copy quality control is specified in a manner that the pattern to which the major parameters for the copy quality control belong is determined referring to the pattern table. Accordingly, in the copy quality diagnosis by a remote control system, it is possible to reason about trouble causes and trouble prediction, quickly and exactly. Thus, a reliable copy quality diagnosis can be realized.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A diagnosing apparatus for diagnosing troubles in multiple devices on the basis of operating status information received by the apparatus from the devices and containing a plurality of factors indicative of operating status of the devices, the apparatus comprising:

a plurality of communication control means, provided in association with the devices, for outputting the received operating status information, wherein said communication control means includes:
  primary trouble predicting means for assigning diagnosis order levels respectively corresponding to levels of necessity of diagnosis to the respective items of information fetched from said devices; and
  transfer timing control means for determining timings of information transfer according to the diagnosis order levels assigned by said trouble predicting means;

a host computer for collecting said operating status information from said plurality of communication control means, and said host computer including an input portion for collecting said operating status information of said communication control means, said input portion further including with a reception order determining means for receiving the information in the diagnosis order level; and a diagnosing section for diagnosing the operating status of said devices on the basis of said operating status information obtained by said host computer, said diagnosing section including analyzing means for analyzing the operating status information of said devices to identify symptoms of a probable trouble common to said devices, and storing means for storing said symptoms identified by said analyzing means.

* * * * *

UNITED STATES PATENT AND TRADEMARK OFFICE
CERTIFICATE OF CORRECTION

PATENT NO. : 5,680,541
DATED : October 21, 1997
INVENTOR(S) : Yutaka KUROSU et al.

It is certified that error appears in the above-indentified patent and that said Letters Patent is hereby corrected as shown below:

In claim 1, Column 28, line 27, after "including", delete "with".

Signed and Sealed this

Fifth Day of May, 1998

Attest:

BRUCE LEHMAN

Attesting Officer

Commissioner of Patents and Trademarks